United States Patent
De Vivero et al.

(10) Patent No.: US 11,283,686 B2
(45) Date of Patent: Mar. 22, 2022

(54) DATA COMMUNICATION VIA COMMUNICATION LINKS

(71) Applicant: THE BOEING COMPANY, Chicago, IL (US)

(72) Inventors: Guillermo De Vivero, Everett, WA (US); Aziz Yousif, Everett, WA (US); Anil Kumar, Sammamish, WA (US); Timothy William Anstey, Seattle, WA (US); Arun Ayyagari, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 6 days.

(21) Appl. No.: 16/558,424

(22) Filed: Sep. 3, 2019

(65) Prior Publication Data

US 2021/0067415 A1    Mar. 4, 2021

(51) Int. Cl.
| | | |
|---|---|---|
| *H04L 12/28* | (2006.01) | |
| *H04L 41/0896* | (2022.01) | |
| *H04B 7/185* | (2006.01) | |
| *H04L 41/0813* | (2022.01) | |
| *H04L 67/12* | (2022.01) | |
| *H04W 72/10* | (2009.01) | |

(52) U.S. Cl.
CPC ..... *H04L 41/0896* (2013.01); *H04B 7/18517* (2013.01); *H04L 41/0813* (2013.01); *H04L 67/12* (2013.01); *H04W 72/10* (2013.01)

(58) Field of Classification Search
CPC ..... H04W 72/10; H04L 41/0896; H04L 67/12
See application file for complete search history.

(56) References Cited

U.S. PATENT DOCUMENTS

| | | | |
|---|---|---|---|
| 7,561,521 B2 | 7/2009 | Meier et al. | |
| 8,676,191 B2* | 3/2014 | Soumier | H04B 7/18506 455/431 |
| 9,295,032 B2 | 3/2016 | Kumar et al. | |
| 2004/0070615 A1 | 4/2004 | Ewing et al. | |
| 2011/0255506 A1 | 10/2011 | Toth et al. | |
| 2015/0215899 A1 | 7/2015 | Kumar et al. | |

(Continued)

OTHER PUBLICATIONS

Extended European Search Report for Application No. 20183266.4 dated Dec. 9, 2020, 6 pgs.

*Primary Examiner* — Bo Hui A Zhu

(57) ABSTRACT

A system for off-board communication includes data storage configured to store one or more data objects. A data object includes data of an application. The data object indicates a data object priority and one or more acceptable communication links associated with the application. The system also includes one or more processors configured to retrieve communication link status from a memory. The communication link status indicates available communication links with available bandwidth. The processors are also configured to retrieve the data object from the data storage based on the data object priority and acceptable communication links of the data object including the available communication links. The processors are further configured to generate, based on the available bandwidth of the available communication links, sub-data objects of the data object. The processors are also configured to initiate concurrent transmission of the sub-data objects via the available communication links.

21 Claims, 12 Drawing Sheets

(56) References Cited

U.S. PATENT DOCUMENTS

| | | | |
|---|---|---|---|
| 2016/0174240 A1* | 6/2016 | Li | H04W 72/085 370/329 |
| 2016/0278072 A1* | 9/2016 | Palle | H04W 72/085 |
| 2016/0302045 A1 | 10/2016 | Steed et al. | |

* cited by examiner

Config. Data 128

| Application Priority List 202 | | | Link Priority List 204 |
|---|---|---|---|
| Application Identifiers 206 | Service Types 208 | App. Priority 164 | Acceptable Link(s) 166 |
| Video Stream Application | Stream | 1 | All (Equal) |
| Health Report | Logging | 2 | 1. Wi-Fi<br>2. Cellular |
| Video Transfer Application | File Transfer | 3 | 1. Wi-Fi |
| Default | | -1 | All (Equal) |

FIG. 2A

Metadata 260

Data Object 124

| Data Object Size 272 | Src 276 | App ID 280 | Criticality (Immediate) 284 | Acceptable Links 288 | Status (Bool Read) 292 |
|---|---|---|---|---|---|
| Data Object Order 274 | Dest 278 | Cost 282 | Criticality (Business) 286 | Criticality (Safety) 290 | TTL 294 |
| Data 262 | | | | | |

FIG. 2B

DATA COMMUNICATION VIA COMMUNICATION LINKS

FIELD

The present disclosure is generally related to data communication via communication links.

BACKGROUND

Aircraft communicate various types of data with ground systems. For example, an aircraft may send a health report indicating sensor readings. As another example, the aircraft may communicate passenger data, such as text messages, a video, photographs, etc. Aircraft networks typically use a single communication link to transfer data associated with a particular application to and from the aircraft based on a pre-determined usage distribution that is not responsive to real-time conditions, such as jitter and latency. Using a single communication link when multiple communication links are available can be an inefficient use of available bandwidth.

SUMMARY

In a particular implementation, a system for communication includes data storage and one or more processors. The data storage is configured to store a data object that includes data of an application. The data object indicates a data object priority and one or more acceptable communication links associated with the application. The data object priority is based on an application priority of the application. The one or more processors are configured to retrieve, from a memory, communication link status of a plurality of communication links. The communication link status indicates a plurality of available communication links with available bandwidth. The one or more processors are also configured to retrieve the data object from the data storage based on the data object priority and acceptable communication links of the data object including the plurality of available communication links. The one or more processors are further configured to generate, based on the available bandwidth of the plurality of available communication links, sub-data objects of the data object. The one or more processors are also configured to initiate concurrent transmission of the sub-data objects via the plurality of available communication links.

In another particular implementation, a method of off-board communication includes retrieving, at a device from a memory, communication link status of a plurality of communication links. The communication link status indicates a plurality of available communication links with available bandwidth. The method also includes retrieving, at the device from data storage, a data object based on a data object priority of the data object and acceptable communication links indicated by the data object including the plurality of available communication links. The data object includes data of an application. The acceptable communication links are associated with the application. The data object priority is based on an application priority of the application. The method further includes generating, based on the available bandwidth of the plurality of available communication links, sub-data objects of the data object. The method also includes initiating concurrent transmission of the sub-data objects via the plurality of available communication links.

In another particular implementation, a computer readable device stores instructions that, when executed by one or more processors, cause the one or more processors to initiate, perform, or control operations for data communication via communication links. The operations include retrieving, from a memory, communication link status of a plurality of communication links. The communication link status indicates a plurality of available communication links with available bandwidth. The operations also include retrieving a data object from data storage based on a data object priority of the data object and acceptable communication links of the data object including the plurality of available communication links. The data object includes data of an application. The acceptable communication links of the data object are associated with the application. The data object priority is based on an application priority of the application. The operations further include generating, based on the available bandwidth of the plurality of available communication links, sub-data objects of the data object. The operations also include initiating concurrent transmission of the sub-data objects via the plurality of available communication links.

The features, functions, and advantages described herein can be achieved independently in various implementations or may be combined in yet other implementations, further details of which can be found with reference to the following description and drawings.

BRIEF DESCRIPTION OF THE DRAWINGS

FIG. 2A is a diagram that illustrates an example of configuration data that may be used by the system of FIG. 1.

FIG. 2B is a diagram that illustrates an example of a data object that may be generated by the system of FIG. 1.

DETAILED DESCRIPTION

Figure 1:
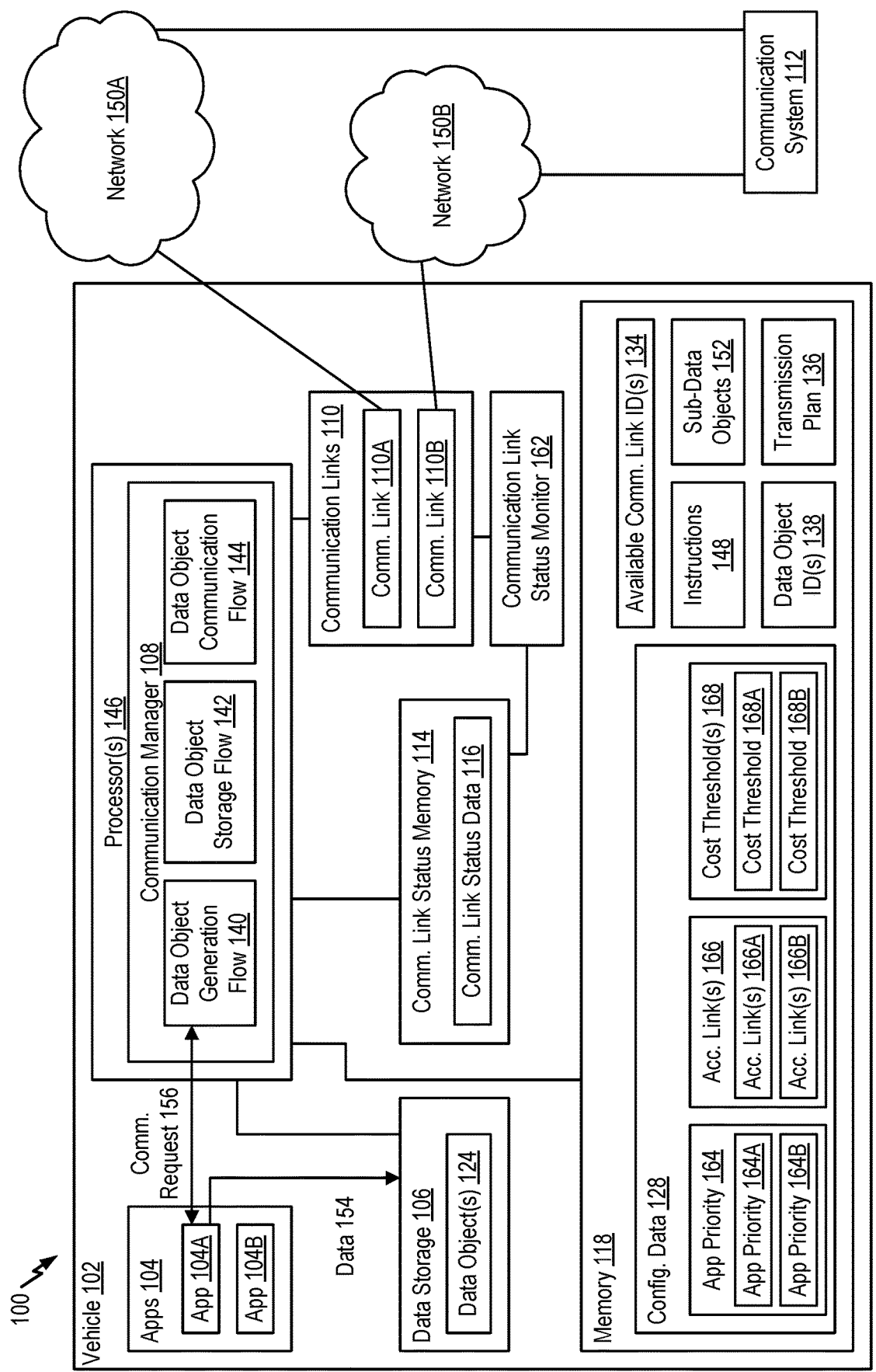
FIG. 1 is a block diagram that illustrates an example of a system configured to perform data communication via communication links.

Aspects disclosed herein present systems and methods for data communication via communication links. A vehicle (e.g., an aircraft, a watercraft, a spacecraft, a car, a truck, a tank, or the like) includes a communication manager configured to manage communications with off-board systems (e.g., a ground system or another aircraft). A communication link, as used herein, refers to at least one single or bi-directional communication link that sends and/or receives data from the vehicle. For example, the communication manager receives data from applications to be sent via communication links to a communication system for forwarding to various destinations (e.g., recipient devices).

Various components on the aircraft have applications that use the communication links to exchange data with off-board communication systems. Some communication links support higher communication bandwidth at a given time than other communication links. In a particular example, at a first time, a satellite communication link of an aircraft supports a first bandwidth and a cellular communication link of the aircraft supports a second bandwidth. To illustrate, when the aircraft is out of range of cellular networks, the cellular communication link supports no bandwidth. Some applications have a higher communication priority than other applications or other components. In some cases, a communication priority of an application can change in real-time. For example, an application that is associated with aircraft safety has higher communication priority during inclement weather than a passenger entertainment application. In some examples, particular applications are associated with particular communication links that are acceptable for communicating data. In a particular aspect, a communication link is acceptable for a particular application based on a utilization cost (e.g., money, bandwidth, or both) of the communication link. For example, a lower cost communication link (e.g., a Wi-Fi link) may be acceptable for sending a passenger video file from the passenger entertainment application, whereas a higher cost communication link (e.g., a cellular link or a satellite link) is also acceptable for sending sensor data from the application associated with aircraft safety.

The communication manager stores (e.g., buffers) application data as data objects in data storage for transmission. For example, the communication manager receives data from an application and generates one or more data objects from the data. A data object includes a portion of the data and metadata. The metadata indicates a communication priority and acceptable communication links associated with the application. The communication priority can be based on real-time information, such as user input, priority data received from an off-board communication system, or both. The communication manager stores the data objects in data storage.

The communication manager identifies available communication links based on communication link status (e.g., determines if a communication link is available for use at a given time). For example, the communication manager determines that a first communication link (e.g., a Wi-Fi link) and a second communication link (e.g., a cellular link) are available. The communication manager retrieves data objects from the data storage based on an application communication priority and acceptable links of the data objects including the available communication links. Selection of the data objects based on the application communication priority and the available communication links enables the communication manager to account for real-time conditions, such as changes in application priority, changes in communication link availability, or a combination thereof. The communication manager transmits a data object via an acceptable link (e.g., the Wi-Fi link) based on determining that an available bandwidth of the acceptable link for a transmission time period is greater than or equal to a size of the data object. Alternatively, the communication manager, based at least in part on determining that no single one of the acceptable links has sufficient available bandwidth, generates smaller sub-data objects from the data object and concurrently transmits the sub-data objects via multiple acceptable links.

Concurrent transmission of the sub-data objects via the available communication links increases a data transfer capacity as compared to sending the data object via a single communication link. The concurrent transmission of the sub-data objects via the multiple communication links can improve security. For example, accessing all of the data for a particular application would require access to multiple communication links. The concurrent transmission of the sub-data objects via the multiple communication links reduces the impact of a single communication link being compromised.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 3, multiple communication requests are illustrated and associated with reference numbers 156A and 156B. When referring to a particular one of these communication requests, such as 156A, the distinguishing letter "a" is used. However, when referring to any arbitrary one of these communication requests or to these communication requests as a group, the reference number 156 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise.

Further, some features described herein are singular in some implementations and plural in other implementations. To illustrate, FIG. 1 depicts a memory 118 storing one or more available communication link identifiers ("available communication link ID(s)" 134 in FIG. 1), which indicates that in some implementations or at some time instances the memory 118 stores a single available communication link identifier and in other implementations or at other time instances the memory 118 stores multiple available communication link identifiers. For ease of reference herein, such features are generally introduced as "one or more" features, and are subsequently referred to in the singular unless aspects related to multiple of the features are being described. It should be understood that, at some time instances, the memory 118 may store no available communication link identifiers.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating", "calculating", "using", "selecting", "accessing", and "determining" are interchangeable unless context indicates otherwise. For example, "generating", "calculating", or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 depicts an example of a system 100 that is configured to support data communication via communication links. The system 100 includes a vehicle 102 and a communication system 112. The vehicle 102 includes an aircraft, an automobile, a boat, an aerial vehicle, a ground vehicle, an aquatic vehicle, an unmanned vehicle, a manned vehicle, a self-driving vehicle, or a combination thereof. The communication system 112 is external to the vehicle 102. In a particular aspect, the communication system 112 includes a communications tower (e.g., a cellular tower), a Wi-Fi access point, an airport, a satellite, another aircraft, or the like, The communication system 112 is coupled to one or more networks. For example, the communication system 112 is coupled to a network 150A, a network 150B, or both. Although, the network 150A is illustrated in FIG. 1 as distinct from the network 150B, in other implementations the network 150A can include one or more components in common with the network 150B. A network 150 includes a wired network, a wireless network, or both. In a particular example, a network 150 includes a satellite network, a terrestrial network, a cellular network, a Wi-Fi network, or a combination thereof.

The vehicle 102 includes a plurality of communication links 110. "Communication link," as used herein, refers to a communication link of the vehicle 102 configured to exchange information with a communication system external (i.e., off-board) the vehicle 102. In a particular example, the vehicle 102 includes a communication link 110A and a communication link 110B configured to communicate with the network 150A and the network 150B, respectively. In a particular example, a communication link 110 includes a communication interface, such as a network interface.

The vehicle 102 includes a communication link status monitor 162 coupled to the communication links 110 and to a communication link status memory 114. The communication link status monitor 162 is configured to generate (or update) communication link status data 116 indicating a status of the communication links 110. Although the communication link status memory 114 and the memory 118 are depicted as separate components in FIG. 1, in other implementations the communication link status memory 114 and the memory 118 can be combined into a single component. The vehicle 102 includes a plurality of applications 104. For example, the vehicle 102 includes an application 104A, an application 104B, one or more additional applications, or a combination thereof. In a particular example, the applications 104 include a passenger application, such as an entertainment application, a messaging application, a social network application, or a combination thereof. In some examples, the applications 104 include an aircraft application, such as a communication application, a navigation application, an aircraft status application, or a combination thereof. In a particular example, an aircraft status application is configured to output sensor data of aircraft sensors, a flight status (e.g., taxiing, ascending, descending, etc.) of the aircraft, location data of the aircraft, or a combination thereof. In a particular aspect, one or more of the applications 104 are integrated into one or more line-replaceable units (LRUs). In a particular example, an application 104A is integrated into the same LRU as an application 104B. In another example, the application 104A is integrated into a first LRU and the application 104B is integrated into a second LRU that is distinct from the first LRU. In a particular example, one or more hardware components (e.g., one or more processor(s)), one or more virtual components, or a combination thereof, are configured to execute the applications 104.

The vehicle 102 includes a memory 118 configured to store configuration data 128. The configuration data 128 indicates acceptable links 166, application priority 164, or both, associated with the applications 104. For example, the configuration data 128 indicates that one or more acceptable links 166A and one or more acceptable links 166B are associated with the application 104A and the application 104B, respectively. In a particular aspect, the acceptable links 166A include a communication link 110A and a communication link 110B, and the acceptable links 166B include the communication link 110B. In a particular example, the configuration data 128 indicates that the application 104A and the application 104B have an application priority 164A and an application priority 164B, respectively. In a particular aspect, the configuration data 128 is based on default data, user input, or both.

In the example illustrated in FIG. 2A, the configuration data 128 includes an application priority list 202 and a link priority list 204. The application priority list 202 indicates application identifiers 206 (e.g., application names), service types 208, and the application priorities 164 of the applications 104. The link priority list 204 indicates the acceptable links 166 for the applications 104. For example, the application priority list 202 indicates that an application 104A (of FIG. 1) having an application identifier 206A is associated with a service type 208A and has an application priority 164A (see also FIG. 1). The link priority list 204 indicates that acceptable links 166A of the application 104A include the communication link 110A, the communication link 110B, or both. In a particular example, the link priority list 204 indicates that the communication link 110A has a first link priority and that the communication link 110B has a second link priority in the acceptable links 166A for the application 104A. To illustrate, a lower cost communication link has a higher link priority for some applications. For other applications, a higher throughput communication link has a higher link priority.

In a particular aspect, a sort order of the acceptable links 166A in the link priority list 204 indicates relative link priority of the acceptable links 166A for the application 104A. As an illustrative example, the link priority list 204 indicates that the communication link 110A of the acceptable links 166A has a first sort order (e.g., 1) that is lower than a second sort order (e.g., 2) of the communication link 110B. In a particular implementation, link priority is inversely related to sort order. In this implementation, the communication link 110A corresponding to the lower sort order (e.g., 1) has a higher link priority than the communication link 110B for the application 104A.

The application priority 164A indicates a data transmission priority (e.g., a communication priority) for the application 104A relative to data transmission priority for other applications. The link priority indicates a priority of a communication link 110A for the application 104A relative to other communication links for the same application 104A. The application priority 164A can be used to determine that data associated with the application 104A is to be considered for transmission next, as described herein. The link priority can be used to select one or more communication links 110 to transmit the data for the application 104A, as described herein.

In a particular implementation, the configuration data 128 indicates a threshold count of communication links (not shown) to be used for data transmission for the applications 104. For example, a threshold communication link count of 1 for an application 104A indicates that any number of communication links 110 can be used to transmit data for the application 104A. As another example, a threshold communication link count of 2 for an application 104A indicates that at least two communication links 110 are to be used to transmit data for the application 104A. A higher threshold communication link count increases data transmission security for the application 104A. For example, more communication links would have to be comprised for unauthorized access to all the data transmitted for the application 104A. A lower threshold communication link count enables data transmission for the application 104A when fewer communication links are available. In a particular aspect, a threshold communication link count of an application 104A is based on user input, a security setting, or both, associated with the application 104A.

Returning to FIG. 1, the vehicle 102 includes one or more processors 146 coupled to the memory 118, the communication link status memory 114, data storage 106, the applications 104, or a combination thereof. The memory 118 includes a computer-readable medium (e.g., a computer-readable storage device) that stores instructions 148 that are executable by the processor(s) 146. The instructions 148 are executable to initiate, perform or control operations to aid in data communication via communication links.

The processor(s) 146 include a communication manager 108 that can be implemented at least in part by the processor(s) 146 executing the instructions 148. The processor(s) 146 can be implemented as a single processor or as multiple processors, such as in a multi-core configuration, a multi-processor configuration, a distributed computing configuration, a cloud computing configuration, or any combination thereof. In some implementations, one or more portions of the communication manager 108 are implemented by the processor(s) 146 using dedicated hardware (e.g., an application-specific integrated circuit (ASIC)), firmware (e.g., a field-programmable gate array (FPGA)), or a combination thereof. In FIG. 1, the communication link status monitor 162 is illustrated as external to the processor(s) 146. In some implementations, the communication link status monitor 162 is implemented at least in part by the processor(s) 146.

The communication manager 108 is configured to perform a data object generation flow 140, a data object storage flow 142, a data object communication flow 144, or a combination thereof. In a particular aspect, the data object generation flow 140, the data object storage flow 142, the data object communication flow 144, or a combination thereof, are performed as one or more processes. For example, the data object communication flow 144 can be performed as a separate process from the data object storage flow 142. The data object generation flow 140 is configured to receive data from the applications 104 and generate one or more data objects 124 from the received data. The data object storage flow 142 is configured to store the data object(s) 124 in the data storage 106. The data object communication flow 144 is configured to transmit the data object(s) 124 via the communication links 110.

Although the communication manager 108, the applications 104, and the communication link status monitor 162 are depicted as separate components in FIG. 1, in other implementations the described functionality of two or more of the communication manager 108, the applications 104, and the communication link status monitor 162 can be performed by a single component. In some implementations, each of the communication manager 108, the applications 104, and the communication link status monitor 162 can be represented in hardware, such as via an application-specific integrated circuit (ASIC) or a field-programmable gate array (FPGA), or the operations described with reference to the elements may be performed by a processor executing computer-readable instructions.

In a particular aspect, one or more components (or flows) of FIG. 1 communicate via interfaces. For example, the communication manager 108 communicates, via an application interface, with the applications 104. As another example, the data object communication flow 144 communicates via a storage interface with the data object storage flow 142.

Although FIG. 1 illustrates particular examples for clarity of explanation, such examples are not to be considered as limitations. For example, although the communication manager 108 is described as including the data object generation flow 140, the data object storage flow 142, and the data object communication flow 144, in other examples the communication manager 108 includes one or more other flows, in addition to, or instead of, the data object generation flow 140, the data object storage flow 142, or the data object communication flow 144, such as data object reprioritization flow, a data object resize flow, or both. For example, the data object reprioritization flow updates a priority of a data object based on detecting updated information, such as an updated application priority indicated by the configuration data 128. As another example, the data object resize flow updates a size of data objects (e.g., by combining data objects or separating a data object into multiple smaller data objects) in response to determining that the data object size indicated by the configuration data 128 has been updated.

Figure 5:
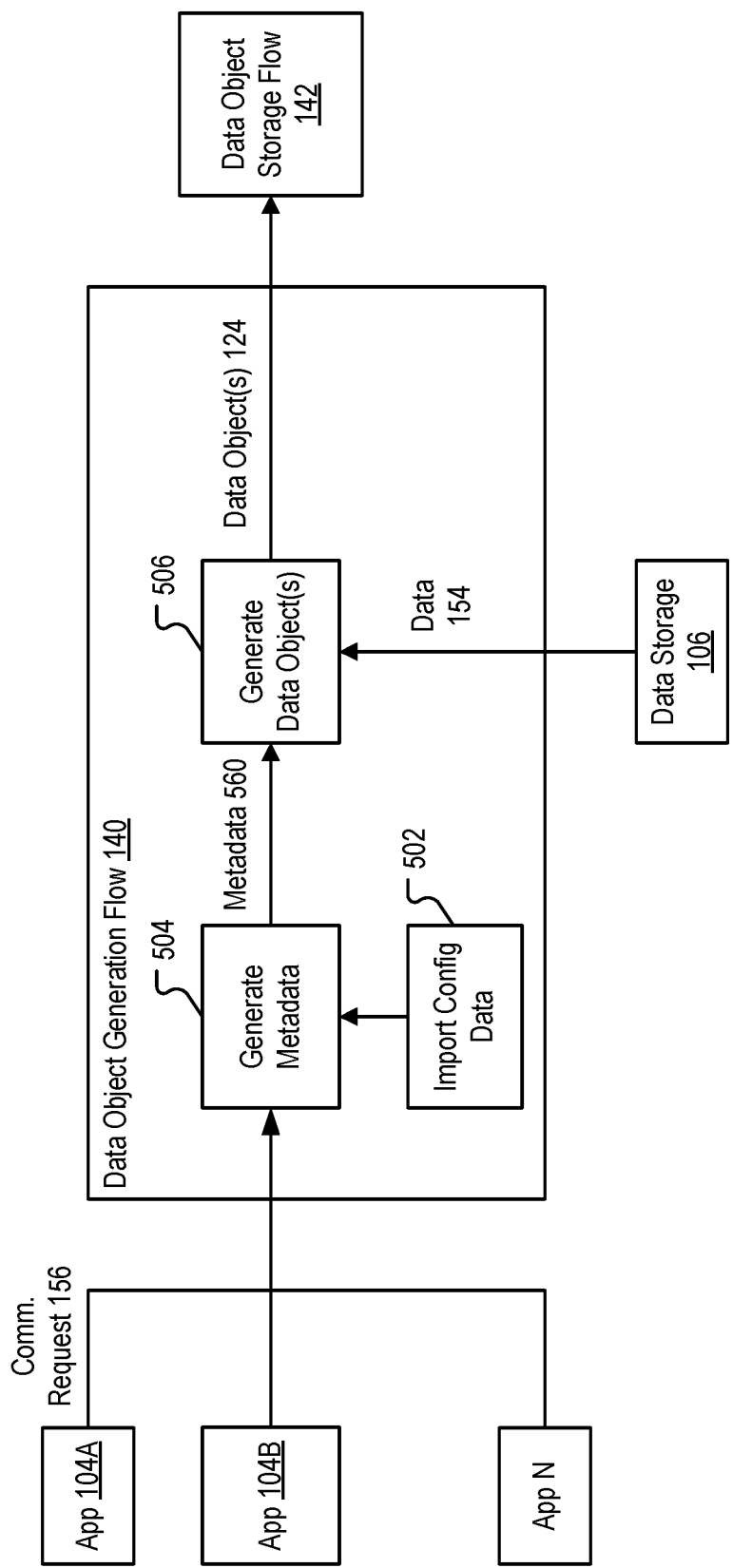
FIG. 5 is a diagram that illustrates an example of a data object generation flow performed by a communication manager of the system of FIG. 1.

During operation, an application 104 sends a communication request 156 to the communication manager 108 to transmit data 154 to a particular destination. In a particular aspect, the data 154 is "pulled" from the application 104. For example, the application 104 sends the data 154 in response to receiving a request (e.g., other data) from the particular destination. The request from the particular destination could be pulled from or pushed by the particular destination. In another aspect, the data 154 is "pushed" from the application 104. For example, the application 104 generates the data 154 for transmission independently of receiving a request from the particular destination. The communication request 156 includes the data 154 or indicates a location (e.g., a memory address) of the data 154. The data object generation flow 140 includes receiving the communication request 156 from the application 104 and generating the data object(s) 124. In the example illustrated in FIG. 5, the data object generation flow 140 includes importing configuration data, at 502. For example, the communication manager 108 imports (e.g., accesses) the configuration data 128 in response to receiving the communication request 156, the data 154, or both.

In a particular aspect, the configuration data 128 is dynamic. For example, an application priority 164, acceptable links 166, a service type 208, or a combination thereof, of an application 104 can be updated based on a user input, an update request received from the communication system 112, or both. In this aspect, the communication manager 108 imports the configuration data 128 in response to an event, such as detecting an expiration of a timer since a previous import of the configuration data 128, detecting performance of an update of the configuration data 128, receiving the communication request 156, or a combination thereof.

The data object generation flow 140 includes generating metadata, at 504. For example, the communication manager 108, in response to receiving the communication request 156 from the application 104, generates metadata 560 for the data 154. The metadata 560 indicates a source (e.g., the vehicle 102), a destination (e.g., the particular destination indicated by the communication request 156), and an application identifier 206 of the application 104. In a particular aspect, the communication manager 108, in response to determining that the application priority list 202 of FIG. 2A indicates an application priority 164 of the application 104, generates the metadata 560 to indicate the application priority 164.

In a particular aspect, the configuration data 128 indicates a time to live (TTL) associated with an application 104. In a particular aspect, the TTL may be used as a cut-off to discard (e.g., mark for deletion) data that has not been transmitted within the time allotted by the cut-off to transmit/receive the data. In a particular aspect, the application 104 sends sensor readings at a particular time interval (e.g., every 10 minutes) and data corresponding to each sensor reading has a TTL (e.g., 10 minutes) so that previous sensor reading data that has not been transmitted can be discarded when data corresponding to a subsequent sensor reading is about to be sent. In a particular example, previous sensor reading data is not transmitted due to unavailability of an acceptable link prior to expiration of the TTL. In another example, previous sensor reading data is not transmitted because acceptable links that were available prior to expiration of the TTL were used to transmit higher priority data. In a particular aspect, the communication manager 108, in response to determining that the configuration data 128 indicates the TTL associated with the application 104, generates the metadata 560 indicating the TTL. In a particular implementation, the configuration data 128 indicates a threshold communication link count associated with the application 104. The communication manager 108, in response to determining that the configuration data 128 indicates the threshold communication link count associated with the application 104, generates the metadata 560 indicating the threshold communication link count.

The communication manager 108, in response to determining that the link priority list 204 indicates that the application 104 is associated with one or more first acceptable links, generates the metadata 560 indicating the first acceptable links (e.g., the communication link 110A, the communication link 110B, or both). In a particular aspect, the configuration data 128 indicates one or more cost thresholds 168 of the applications 104. For example, the cost thresholds 168 include a cost threshold 168A and a cost threshold 168B associated with the application 104A and the application 104B, respectively. In a particular example, data associated with the application 104 can be sent by one or more acceptable links of the application 104 with a total link utilization cost that is less than or equal to the cost threshold 168 of the application 104. In a particular aspect, link utilization cost of a communication link 110 indicates a monetary cost of transmitting data via the communication link 110 and the cost threshold 168 indicates a threshold monetary cost (e.g., a maximum monetary cost) that is acceptable for transmitting data of the application 104. In a particular example, data associated with the application 104 can be sent via a free communication link and not via a paid communication link. In a particular aspect, the cost threshold 168 indicates a total cost threshold associated with transmitting data for an application 104. For example, a higher cost communication link is acceptable to send some of the sub-data objects 152 of a data object 124 as long as a total cost of sending all the sub-data objects 152 of the data object 124 is less than or equal to the total cost threshold. In a particular aspect, the cost threshold 168 is based on user input. For example, a user input received from a user of the application 104 indicates the cost threshold 168 that is acceptable to the user. In a particular aspect, a communication link 110 corresponds to a paid Wi-Fi link that the user has paid to use during a flight and the cost threshold 168 indicates an additional data usage charge threshold. To illustrate, the paid Wi-Fi link is associated with an additional charge for transmitting more than a particular amount (e.g., 1 gigabyte) of data and the cost threshold indicates the additional charge for transmitting more than the particular amount of data. In another example, a user input indicates airline-specific parameters. To illustrate, the user input indicates the cost threshold that is acceptable for an airline for a particular seat, a particular seating area, or both. The communication manager 108, in response to determining that the configuration data 128 indicates that the application 104 is associated with a cost threshold 168, generates the metadata 560 indicating the cost threshold 168.

The data object generation flow 140 includes generating data objects(s), at 506. For example, the communication manager 108 generates the data object(s) 124 from the data 154. In a particular aspect, the application 104 stores the data 154 in the data storage 106 and the communication request 156 indicates a memory address of the data 154 in the data storage 106. The communication manager 108 uses the memory address to retrieve the data 154 and generates the data object(s) 124. In a particular aspect, each of the data object(s) 124 is of a predetermined data object size. In a particular aspect, where the data 154 is not evenly divisible between data objects of the predetermined data object size, each of the data object(s) 124 except a data object 124 corresponding to a last portion of the data 154 is of the predetermined data object size and the data object 124 corresponding to the last portion of the data 154 has a size that is less than the predetermined data object size. In a particular aspect, the configuration data 128 indicates the predetermined data object size. In a particular aspect, a first predetermined data object size is associated with an application 104A and a second predetermined data object size is associated with an application 104B.

Turning now to FIG. 2B, each of the data object(s) 124 includes metadata and a corresponding portion of the data 154. The metadata is based at least in part on the metadata 560. In the example illustrated in FIG. 2B, a data object 124 includes metadata 260 and a data field 262. The data field 262 includes at least a portion of the data 154. The metadata 260 includes a data object size field 272, a data object order field 274, a source field 276, a destination field 278, an application identifier field 280, a cost field 282, a first criticality field 284 (e.g., immediate), a second criticality field 286 (e.g., business), a third criticality field 290 (e.g., safety), an acceptable links field 288, a status field 292, and a time to live field 294. For example, the data object size field 272 indicates a size of the data object 124. The data object order field 274 indicates a sequence number of the data object 124 within a set of data objects corresponding to the application 104 that have been generated by the communication manager 108. In a particular aspect, the data object order field 274 indicates a count of data objects corresponding to the application 104 that have previously been generated by the communication manager 108. In a particular aspect, the data object order field 274 indicates an identifier of the data object 124.

The source field 276, the destination field 278, the application identifier field 280, the cost field 282, the acceptable links field 288, and the TTL field 294 indicate the source (e.g., the vehicle 102), the destination (e.g., the particular destination), the application identifier (e.g., identifier of the application 104), the cost threshold, the acceptable links, and the TTL, respectively, indicated by the metadata 560. In a particular aspect, the metadata 260 includes a threshold communication link count field. The threshold communication link count field indicates the threshold communication link count indicated by the metadata 560. In a particular aspect, values of the first criticality field 284, the second criticality field 286, and the third criticality field 290 indicate a data object priority of the data object 124. The communication manager 108 sets values of the first criticality field 284, the second criticality field 286, the third criticality field 290, or a combination thereof, based on the application priority 164 indicated by the metadata 560. For example, the communication manager 108, in response to determining that the metadata 560 indicates an application priority 164 having a first value (e.g., −1), sets each of the first criticality field 284, the second criticality field 286, and the third criticality field 290 to a first value (e.g., 0) indicating that the data object 124 does not include critical data. As another example, the communication manager 108, in response to determining that the metadata 560 indicates an application priority 164 having a second value (e.g., 1) sets one or more of the first criticality field 284, the second criticality field 286, or the third criticality field 290 to a second value (e.g., 1) to indicate that the data object 124 includes a particular type of critical data (e.g., immediate, business, or safety critical data). The metadata 260 including three criticality fields indicating a data object priority of the data object 124 is provided as an illustrative example. In other examples, the metadata 260 may include fewer than three fields or more than three fields indicating a data object priority of the data object 124.

The communication manager 108 initializes the status field 292 to a first value (e.g., 0). In a particular aspect, the data object communication flow 144 includes setting the status field 292 to a second value (e.g., 1) in response to retrieving the data object 124 from the data storage 106 for transmission, as further described herein.

The data object generation flow 140 includes providing the data object(s) 124 to the data object storage flow 142. In a particular example, the data object storage flow 142 processes the data object(s) 124 one-by-one as the data object(s) 124 are generated by the data object generation flow 140.

Figure 6:
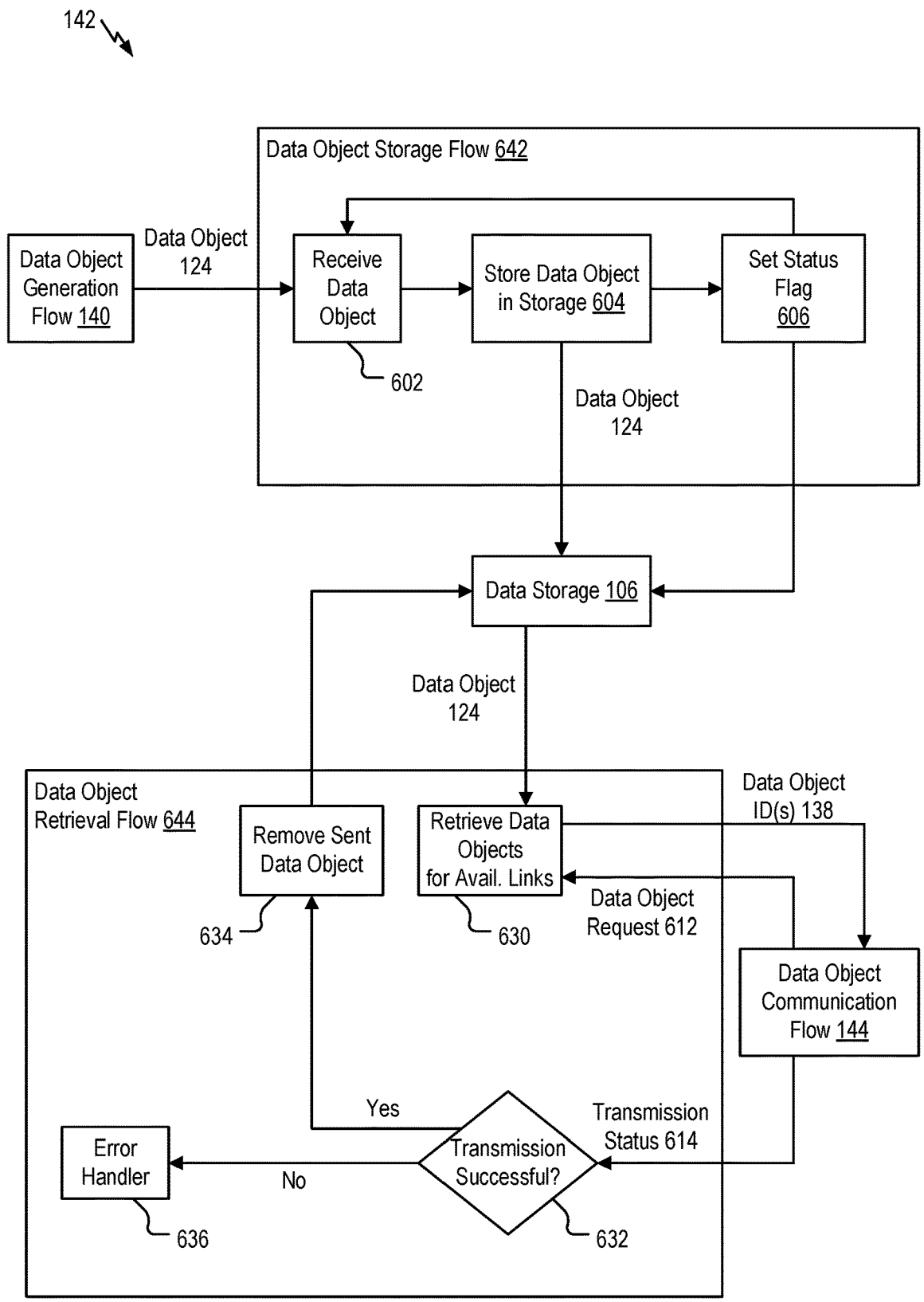
FIG. 6 is a diagram that illustrates examples of data object storage flows performed by a communication manager of the system of FIG. 1.

In the example illustrated in FIG. 6, the data object storage flow 142 includes a data object storage flow 642 and a data object retrieval flow 644. The data object storage flow 642 is performed in response to receiving a data object 124 from the data object generation flow 140. The data object retrieval flow 644 is performed in response to receiving a data object request 612, a transmission status 614, or both, as described herein below.

The data object storage flow 642 includes receiving a data object, at 602. For example, the communication manager 108 (e.g., a process of the communication manager 108 corresponding to the data object storage flow 642) receives the data object 124.

The data object storage flow 642 includes storing the data object in storage, at 604. For example, the communication manager 108 stores the data object 124 in the data storage 106. In a particular aspect, the communication manager 108 stores the data object 124 in a priority queue based on a data object priority of the data object 124.

The data object storage flow 642 includes setting a status flag (e.g., a status bit or Boolean value), at 606. For example, the communication manager 108 sets the status field 292 of the data object 124 to a first value (e.g., 0). The data object storage flow 642 returns to 602. For example, the communication manager 108 (e.g., a process of the communication manager 108 corresponding to the data object storage flow 642) processes a next data object 124 received from the data object generation flow 140.

Returning to FIG. 1, the communication link status monitor 162 generates (or updates) the communication link status data 116. In a particular aspect, the communication link status monitor 162 updates the communication link status data 116 in response to detecting an event, such as expiration of a timer, the vehicle 102 entering a coverage area of a network, the vehicle 102 exiting a coverage area of a network, detecting a change in an operational state (e.g., parked, taxiing, take-off, cruise, or landing) of the vehicle 102, receiving a user request, or a combination thereof.

Figure 9:
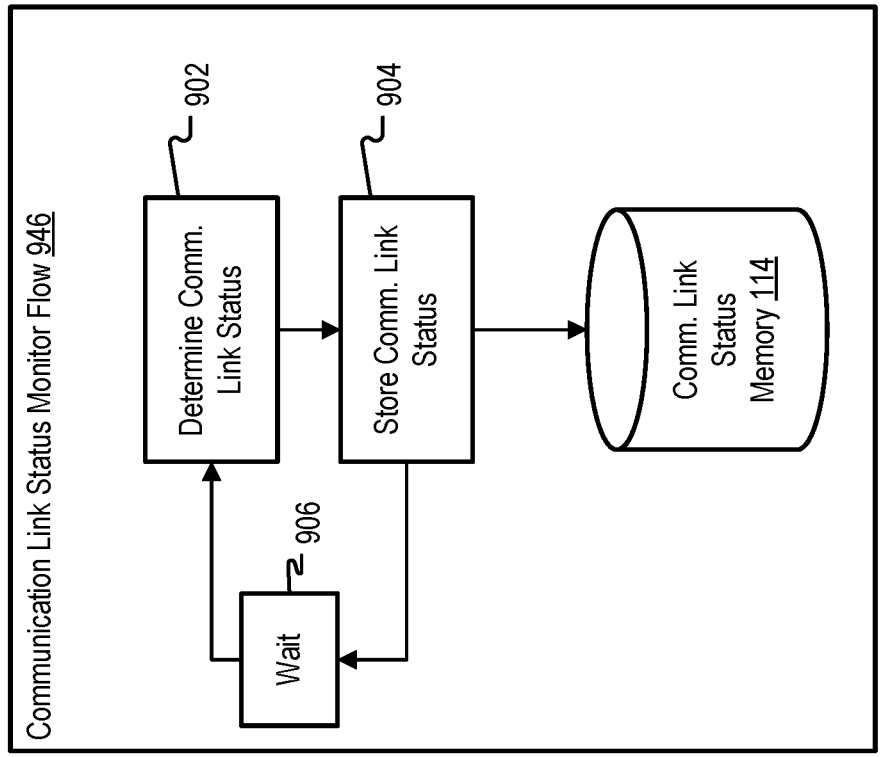
FIG. 9 is a diagram that illustrates an example of a communication link status monitor flow performed by a communication link status monitor of the system of FIG. 1.

In the example illustrated in FIG. 9, a communication link status monitor flow 946 performed by the communication link status monitor 162 includes determining a communication link status, at 902. For example, the communication link status monitor 162, at a first time, generates (or updates) the communication link status data 116 indicating a communication link status of the communication links 110. In a particular aspect, the communication link status data 116 indicates a first communication link status of a communication link 110 corresponding to a first direction (e.g., transmit or forward) and a second communication link status of the communication link 110 corresponding to a second direction (e.g., receive or reverse). For example, the first communication link status of the communication link 110 indicates a throughput, a jitter, a latency, a packet loss, or a combination thereof, associated with data communication via the communication link 110 in the first direction (e.g., transmission or forward).

In a particular example, the communication link status monitor 162 determines that a communication link 110 is unavailable in response to determining that the vehicle 102 is out of range of a network 150 of FIG. 1. In a particular example, the communication link status monitor 162 determines that the communication link 110 is unavailable in response to determining that a detected throughput, a detected jitter, a detected latency, a detected packet loss, or a combination thereof, of the communication link 110 fails to satisfy one or more corresponding thresholds. The communication link status monitor 162, in response to determining that a communication link 110 is unavailable, updates the communication link status data 116 to indicate that the communication link 110 is unavailable.

The communication link status monitor flow 946 includes storing the communication link status, at 904. For example, the communication link status monitor 162 stores the communication link status data 116 in the communication link status memory 114.

The communication link status monitor flow 946 includes waiting, at 906. For example, the communication link status monitor 162 sleeps until a particular event (e.g., expiration of a timer, entering or exiting a network, receiving a request, or a combination thereof) is detected. The communication link status monitor flow 946 returns to 902. For example, the communication link status monitor 162, at a second time, generates (or updates) the communication link status data 116 indicating a communication link status of the communication links 110. The communication link status data 116 generated at the second time may be distinct from the communication link status data 116 generated at the first time because of dynamic network conditions, changing location of the vehicle 102, or a combination thereof.

Returning to FIG. 1, the data object communication flow 144, based on the communication link status data 116, attempts to transmit the data object(s) 124 via the communication links 110. In the examples illustrated in FIGS. 7-8, the data object communication flow 144 includes a data object communication flow 744 and a data object communication flow 746.

Figure 8:
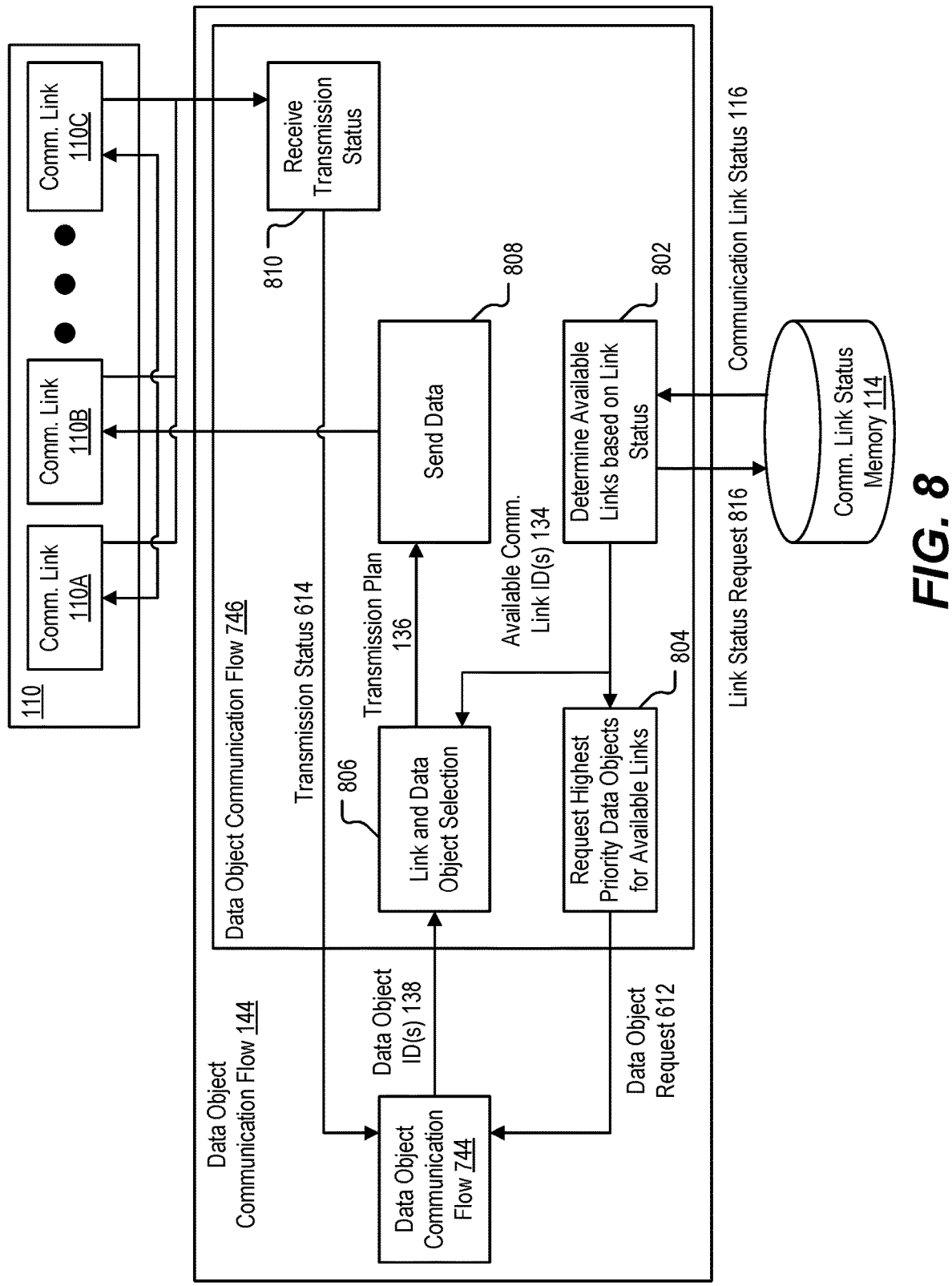
FIG. 8 is a diagram that illustrates an example of another data object communication flow performed by a communication manager of the system of FIG. 1.

In FIG. 8, the data object communication flow 746 includes determining available links based on link status, at 802. For example, the communication manager 108 (e.g., a process of the communication manager 108 corresponding to the data object communication flow 144) determines that the communication link status data 116 indicates that one or more (e.g., the communication link 110A and the communication link 110B) of the communication links 110 are available. The communication links 110 include a communication link 110A, a communication link 110B, a communication link 110C, one or more additional communication links, or a combination thereof. The communication manager 108 generates one or more available communication link identifier(s) 134 of the one or more communication links indicated as available by the communication link status data 116. In a particular example, the communication link status data 116 indicates that the communication link 110A and the communication link 110B are available and that the communication link 110C is not available. In this example, the available communication link identifier(s) 134 includes an identifier of the communication link 110A and an identifier of the communication link 110B and does not include an identifier of the communication link 110C.

The data object communication flow 746 includes requesting highest priority data objects for available links, at 804. For example, the data object communication flow 746 generates a data object request 612 indicating the available communication link identifier(s) 134. The data object communication flow 746 sends the data object request 612 to the data object communication flow 744. In the example illustrated in FIG. 7, the data object communication flow 744 forwards the data object request 612 from the data object communication flow 746 to the data object storage flow 142.

Returning to FIG. 6, the data object retrieval flow 644 of the data object storage flow 142, in response to receiving the data object request 612, retrieves one or more data objects 124 for available links, at 630. For example, the communication manager 108 (e.g., a process of the communication manager 108 corresponding to the data object retrieval flow 644) selects one or more of the data object(s) 124 that have a greater priority than certain other data objects 124 (e.g., have the highest priority), and correspond to the communication links identified by the available communication link identifier(s) 134. In a particular implementation, the communication manager 108 selects the one or more data object(s) 124 with a threshold communication link count that is less than or equal to a count of the communication links indicated by the available communication link identifier(s) 134. The communication manager 108 determines one or more data object identifiers 138 of the selected data objects.

In a particular example, the data storage 106 includes a plurality queue storing the data object(s) 124 in priority order. The communication manager 108 retrieves a data object 124 as a next highest priority data object from the priority queue. For example, a next highest priority data object corresponds to a data object 124 with the status field 292 indicating a first value (e.g., 0) and having a next highest priority. In a particular aspect, the communication manager 108 discards (e.g., deletes or marks for deletion) a data object 124 in response to determining that a TTL value indicated by the TTL field 294 of the data object 124 has expired. The communication manager 108 selects the data object 124 in response to determining that the data object 124 has not expired, that a communication link 110 is an acceptable communication link for the data object 124 (as indicated by the acceptable links field 288), that the communication link 110 is an available communication link (as indicated by the available communication link identifier(s) 134), and that a count of selected data objects (as indicated by the data object identifier(s) 138) for which the communication link 110 is acceptable is less than a threshold.

In a particular aspect, the threshold (e.g., 2) indicates that multiple data objects can be selected for each available communication link. In a particular example, selecting multiple data objects for a communication link 110 can enable transmission of multiple data objects via the communication link in cases where available bandwidth of the communication link 110 is large enough to accommodate transmission of the multiple data objects. In a particular example, a data object 124 may have multiple acceptable communication links 110 that are available. Selecting multiple data objects for a communication link 110 increases a likelihood of transmitting at least one of the data objects 124 via the communication link 110 in cases where some of the data objects could be transmitted by other communication links 110.

The communication manager 108, in response to selecting the data object 124, updates the data object identifier(s) 138 to include an identifier of the data object 124, updates the status field 292 of the data object 124 to a second value (e.g., 1) to indicate that the data object 124 has been selected, or both. The communication manager 108 processes a next highest priority data object in the priority queue until there are no more next highest priority data objects in the priority queue or a count of selected data objects corresponding to each of the available communication links satisfies a threshold.

The communication manager 108 sends the data object identifiers 138 indicating the selected data objects to the data object communication flow 144. In a particular aspect, the communication manager 108, in response to determining that the data object identifiers 138 do not include any identifiers, sends a response to the data object communication flow 144 indicating that no data objects have been selected.

Figure 7:
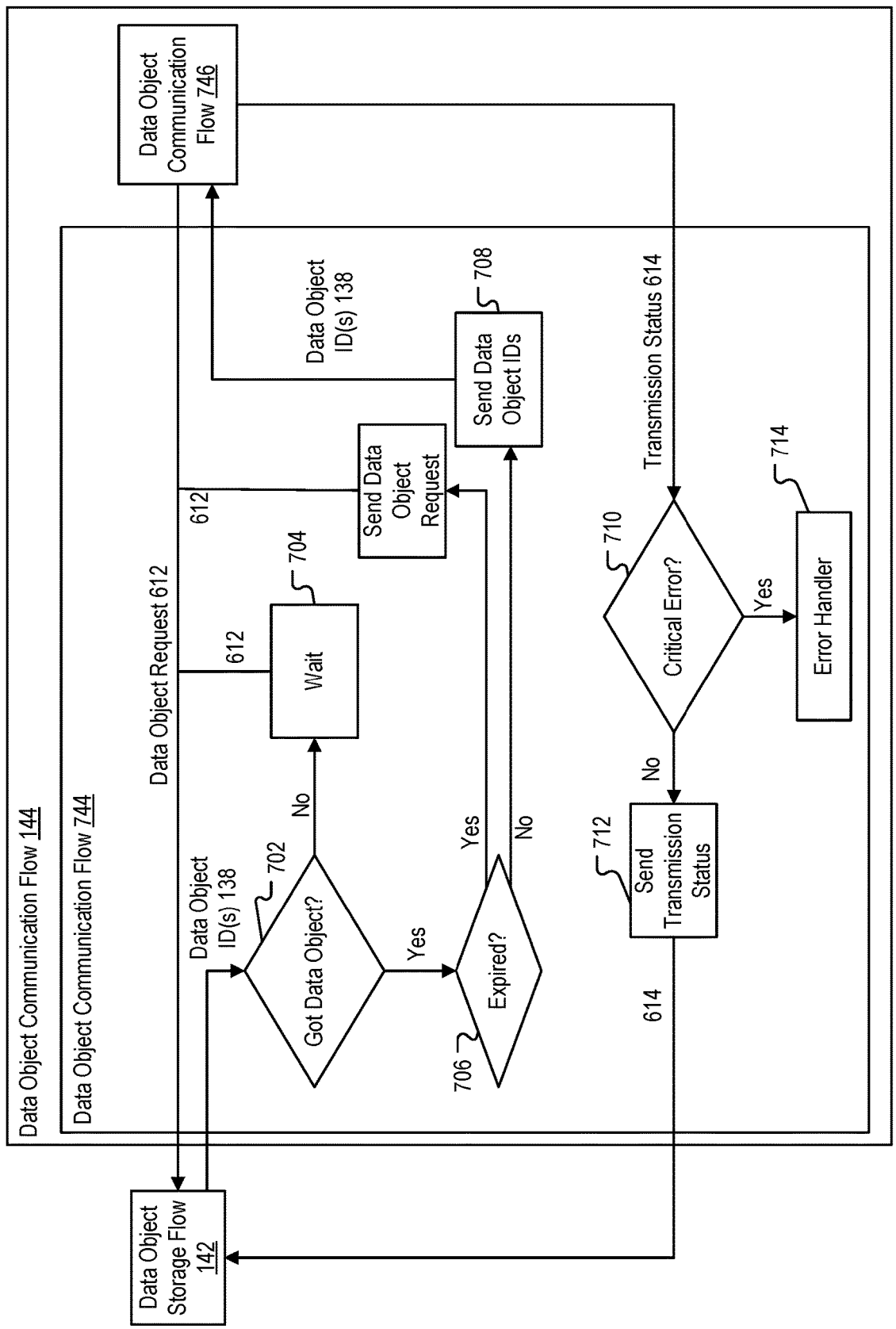
FIG. 7 is a diagram that illustrates an example of a data object communication flow performed by a communication manager of the system of FIG. 1.

In FIG. 7, the data object communication flow 744 includes determining whether any data objects have been received, at 702. For example, the communication manager 108, in response to receiving a response from the data object storage flow 142 indicating that no data objects have been selected, determines that no data objects have been received. Alternatively, the communication manager 108, in response to receiving the data object identifiers 138 including at least one data object identifier from the data object storage flow 142, determines that at least one data object has been received.

The data object communication flow 744 includes, in response to determining that no data objects have been received, at 702, sending a data object request to the data object storage flow 142 after waiting, at 704. For example, the communication manager 108, in response to detecting an expiration of a timer, sends the data object request 612 to the data object storage flow 142. Additional data objects may have been stored in the data storage 106 by the data object storage flow 142 since the data object request 612 was previously sent to the data object storage flow 142.

The data object communication flow 744 includes, in response to determining that at least one data object has been received, at 702, determining whether all of the received data objects have expired, at 706. For example, the communication manager 108 updates the data object identifiers 138 to remove identifiers of any data object 124 with a TTL field 294 indicating a TTL value that has expired. The communication manager 108 determines that all of the received data objects have expired in response to determining that there are no remaining data object identifiers 138 after removing the expired data objects.

The data object communication flow 744 includes, in response to determining that all of the received data objects have expired, at 706, sending a data object request, at 612. For example, the communication manager 108 sends the data object request 612 to the data object storage flow 142. In a particular aspect, the data object request 612 indicates data object identifiers of the expired data objects and data object retrieval flow 644 of FIG. 6 includes discarding (e.g., deleting or marking for deletion) the expired data objects from the data storage 106. In a particular aspect, the data object request 612 includes a request TTL. For example, the data object communication flow 744 refrains from resending the data object request 612 to the data object storage flow 142 in response to determining that the request TTL has expired. To illustrate, the available communication links may have changed since the data object request 612 was initially sent by the data object communication flow 746 and the request TTL reduces a likelihood of resources being used to identify data objects corresponding to outdated available communication link information.

The data object communication flow 744 includes, in response to determining that at least one of the received data objects is unexpired, at 706, sending the data object identifiers to the data object communication flow, at 708. For example, the communication manager 108 (e.g., a process of the communication manager 108 corresponding to the data object communication flow 744) sends the data object identifier(s) 138 (e.g., the remaining unexpired identifiers) to the data object communication flow 746.

In FIG. 8, the data object communication flow 746 includes link and data object selection, at 806. For example, the communication manager 108 (e.g., a process of the communication manager 108 corresponding to the data object communication flow 746) generates a transmission plan 136 based on the data object identifier(s) 138 (received from the data object communication flow 744) and the available communication link identifier(s) 134.

In a particular aspect, the communication manager 108 generates available link bandwidth data based on the communication link status data 116. For example, the communication link status data 116 indicates a throughput (e.g., 1.1 megabytes per second), a packet loss (e.g., 3/1000), or both, of a communication link 110. The configuration data 128 indicates a transmission time period (e.g., 2 seconds). The communication manager 108 determines an available link bandwidth (e.g., 2.19 megabytes/transmission time period) of the communication link 110 based on the throughput, the packet loss, and the transmission time period (e.g., available link bandwidth=throughput*(1-packet loss)*transmission time period). The communication manager 108 generates the available link bandwidth data to indicate the available link bandwidth of the communication link 110.

Figure 10:
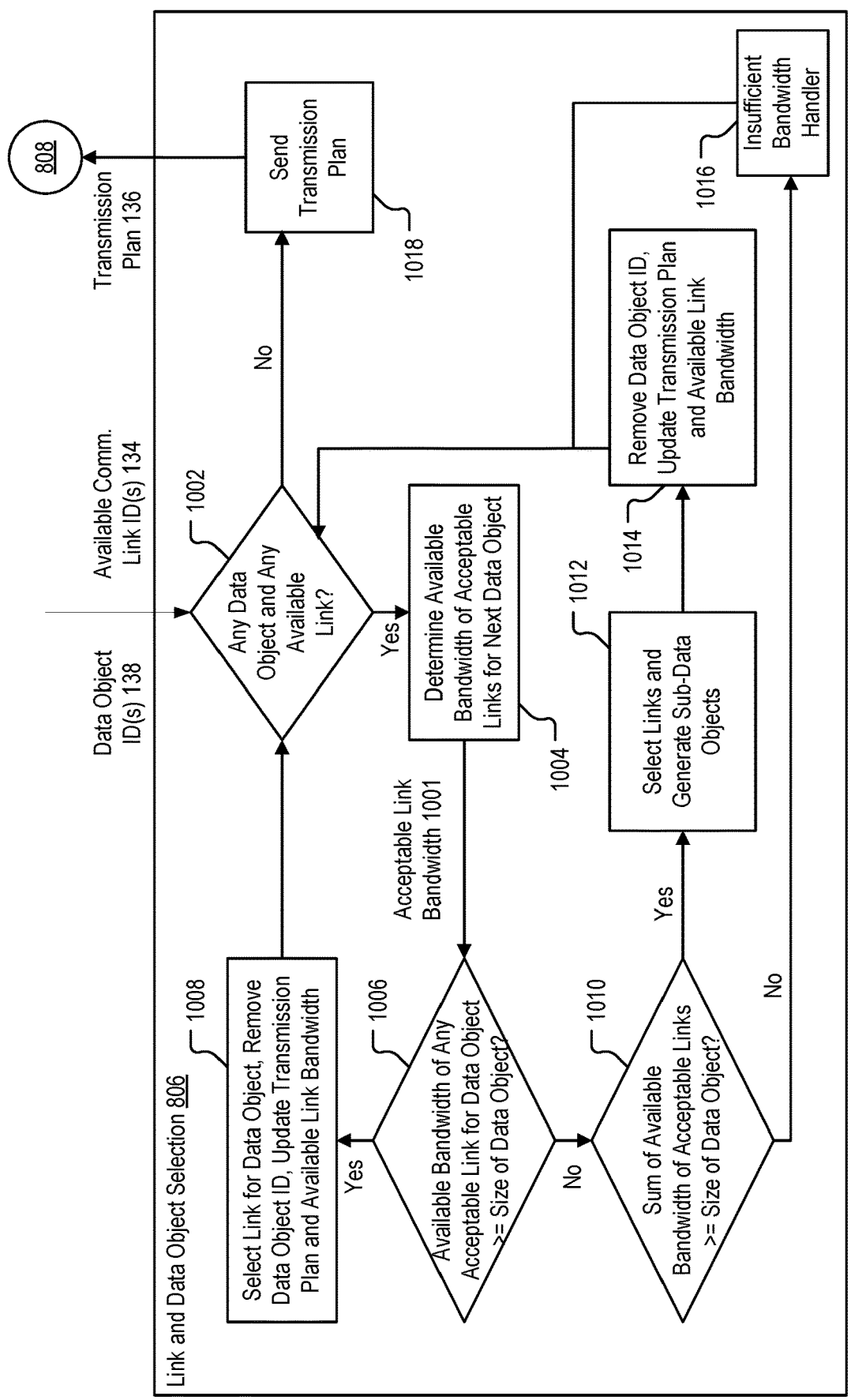
FIG. 10 is a diagram that illustrates an example of link and data object selection performed by a communication manager of the system of FIG. 1.

In the example illustrated in FIG. 10, the link and data object selection 806 includes determining whether there are any remaining data objects and any remaining available links, at 1002. For example, the communication manager 108 (e.g., a process of the communication manager 108 corresponding to the data object communication flow 746) determines whether the data object identifier(s) 138 indicate at least one data object identifier and whether the available communication link identifier(s) 134 indicate at least one communication link 110.

The link and data object selection 806 includes, in response to determining that at least one data object remains and at least one available link remains, at 1002, determining available bandwidth of acceptable links for a next data object, at 1004. For example, the communication manager 108 selects a next data object (e.g., a next data object identifier) from the data object identifier(s) 138. In a particular aspect, the data object identifier(s) 138 indicate data object identifiers in priority order of the corresponding data objects and the communication manager 108 selects a next highest priority data object 124 based on the data object identifier(s) 138. The communication manager 108 determines one or more acceptable communication links indicated by the acceptable links field 288 of the data object 124. For example, the communication manager 108 determines that the acceptable communication links of the data object 124 includes the first communication link 110A and the second communication link 110B.

The communication manager 108 identifies, based on the available link bandwidth data, available link bandwidth 1001 for each of the acceptable communication links. For example, the communication manager 108 determines that the available link bandwidth data indicates a first available bandwidth (e.g., 2.19 megabytes/transmission time period) of a first communication link 110A and a second available bandwidth of a second communication link 110B.

The link and data object selection 806 includes determining whether available bandwidth of any acceptable link for the data object is greater than or equal to a size of the data object, at 1006. For example, the communication manager 108 determines, based on the available link bandwidth 1001, whether the available bandwidth of any acceptable links for the data object 124 (e.g., the highest priority data object indicated by the data object identifiers 138) have an available bandwidth that is greater than or equal to the size of the data object 124. To illustrate, the communication manager 108 determines whether either of the first available bandwidth (e.g., 2.19 MB/transmission time period) or the second available bandwidth is greater than or equal to a size of the data object 124.

The link and data object selection 806 includes, in response to determining that available bandwidth of at least one acceptable link for the data object is greater than or equal to the size of the data object, at 1006, selecting an acceptable link for the data object, removing data object identifier, updating the transmission plan, and updating available link bandwidth for the acceptable link, at 1008. For example, the communication manager 108 selects the communication link 110A in response to determining that the first available bandwidth (e.g., 2.19 MB/transmission time period) is greater than or equal to the size of the data object 124. In a particular aspect, the communication manager 108, in response to determining that available bandwidth of multiple acceptable links is greater than or equal to the size of the data object 124, selects one of the multiple acceptable links. For example, the communication manager 108 selects the communication link 110A from the communication links 110A and 110B in response to determining that each of the first available bandwidth (e.g., 2.19 MB/transmission time period) and the second available bandwidth is greater than or equal to the size of the data object 124. In a particular example, the communication manager 108 selects the communication link 110 in response to determining that the link priority list 204 indicates that a first priority of the communication link 110A is higher than a second priority of the communication link 110B, that a first cost of the communication link 110A is lower than a second cost of the communication link 110B, or both. In a particular example, the communication manager 108 selects the communication link 110 in response to determining that a threshold communication link count indicated by the data object 124 has a particular value (e.g., 1) indicating that data for the application 104 associated with the data object 124 is permitted to be transmitted using a single communication link.

The communication manager 108, in response to selecting the communication link 110A for the data object 124, removes an identifier of the data object 124 from the data object identifier(s) 138, updates the transmission plan 136 to indicate that the data object 124 is to be transmitted via the communication link 110A, updates (e.g., reduces) the available bandwidth indicated in the available link bandwidth data for the communication link 110A by the size of the data object 124, or a combination thereof. The link and data object selection 806 proceeds to 1002.

The link and data object selection 806 includes, in response to determining that available bandwidth of none of the acceptable links for the data object is greater than or equal to the size of the data object, at 1006, determining whether a sum of available bandwidth of the acceptable links is greater than or equal to the size of the data object, at 1010. For example, the communication manager 108, in response to determining that each of the first available bandwidth (e.g., 2.19 MB/transmission time period) and the second available bandwidth is less than the size of the data object 124, determines whether a sum of the first available bandwidth (e.g., 2.19 MB/transmission time period) and the second available bandwidth is greater than or equal to the size of the data object 124.

The link and data object selection 806 includes, in response to determining that the sum of available bandwidth of the acceptable links is greater than or equal to the size of the data object, at 1010, selecting links and generating sub-data objects, at 1012. For example, the communication manager 108 selects, based on link priority, link cost, or both, multiple communication links such that a sum of available bandwidth of the selected communication links is greater than or equal to a size of the data object 124. To illustrate, the communication manager 108, in response to determining that a sum of the first available bandwidth (e.g., 2.19 MB/transmission time period) and the second available bandwidth is greater than or equal to the size of the data object 124, selects the communication link 110A and the communication link 110B. In a particular example, the communication manager 108 selects the multiple communication links based on determining that a count of the multiple communication links is greater than or equal to a threshold communication link count indicated by the data object 124.

The communication manager 108 generates the sub-data objects 152 from the data object 124. For example, the communication manager 108 generates a first sub-data object of the sub-data objects 152 for transmission via the communication link 110A and a second sub-data object of the sub-data objects 152 for transmission via the communication link 110B. A data field of the first sub-data object includes a first portion of data included in the data field 262 of the data object 124. A data field of the second sub-data object includes a second portion of the data included in the data field 262 of the data object 124. In some examples, the second portion of data is distinct from the first portion of the data. In some examples, the second portion of the data overlaps the first portion of the data in the data field 262. A first size of the first sub-data object is less than or equal to the first available bandwidth (e.g., 2.19 MB/transmission time period) of the communication link 110A. A size of the second sub-data object is less than or equal to the second available bandwidth of the communication link 110B.

In a particular example, the communication manager 108 estimates a total utilization cost of transmitting the sub-data objects 152 via the multiple communication links and selects the multiple communication links in response to determining that the total utilization cost is less than or equal to a total utilization cost threshold indicated by the cost field 282 of the data object 124. For example, the communication manager 108 determines a total utilization cost based on a sum of a first cost of transmitting the first sub-data object via the communication link 110A and a second cost of transmitting the second sub-data object via the communication link 110B. The communication manager 108 selects the communication link 110A and the communication link 110B in response to determining that the total utilization cost is less than or equal to the total utilization cost threshold indicated by the cost field 282 of the data object 124.

The link and data object selection 806 includes removing data object identifier, updating the transmission plan, and updating the available link bandwidth of the links, at 1014. For example, the communication manager 108, in response to selecting the multiple communication links, removes the identifier of the data object 124 from the data object identifier(s) 138, updates the transmission plan 136 to indicate that the sub-data objects 152 are to be transmitted by the multiple communication links, and updates the available bandwidth indicated in the available link bandwidth data for the multiple communication links. To illustrate, the communication manager 108, in response to selecting the communication link 110A and the communication link 110B, updates the transmission plan 136 to indicate that the first sub-data object and the second sub-data object of the sub-data objects 152 are to be transmitted by the communication link 110A and the communication link 110B, respectively. The communication manager 108 updates the first available bandwidth of the communication link 110A and the second available bandwidth of the communication link 110B indicated in the available link bandwidth data by a first size of the first sub-data object and a second size of the second sub-data object, respectively. A technical effect of using multiple communication links to transmit the sub-data objects 152 is that the data of the data object 124 can be transmitted during a single transmission time period (e.g., the transmission time period used to determine the available link bandwidth 1001) over the multiple communication links in cases where a single communication link does not have sufficient available bandwidth to transmit the data object 124 during the single transmission time period. In a particular example, a first portion of the data may be transmitted over a cellular communication link concurrently with a second portion of the data being transmitted over a Wi-Fi communication link. In another example, a first portion of the data may be transmitted over a first Wi-Fi communication link concurrently with a second portion of the data being transmitted over a second Wi-Fi communication link. In a particular aspect, a first transmission of the first portion of the data overlaps a second transmission of the second portion of the data. The link and data object selection 806 continues to 1002.

The link and data object selection 806 includes, in response to determining that the sum of available bandwidth of the acceptable links is less than the size of the data object, at 1010, invoking an insufficient bandwidth handler, at 1016. For example, the communication manager 108 determines, based on the configuration data 128, whether the data object 124 is to be discarded, transmitted at a later time, divided into smaller data objects, or a combination thereof. In a particular aspect, the communication manager 108, in response to determining that the configuration data 128 indicates that data objects for the application 104 are to be discarded if there is insufficient bandwidth, sends a data object deletion request indicating the data object 124 to the data object storage flow 142 and the data object storage flow 142 deletes (or marks for deletion) the data object 124.

In a particular aspect, the communication manager 108, in response to determining that the configuration data 128 indicates that data objects for the application 104 are to be transmitted at a later time if there is insufficient bandwidth, sends a data object status request indicating the data object 124 to the data object storage flow 142 and the data object storage flow 142 updates the status field 292 of the data object 124 to a first value (e.g., 0) to indicate that the data object 124 has not been transmitted.

In a particular aspect, the communication manager 108, in response to determining that the configuration data 128 indicates that data objects for the application 104 are to be divided into smaller data objects if there is insufficient bandwidth, divides the data object 124 into sets of sub-data objects for transmission via one or more acceptable links for the data object 124 that have available bandwidth. In a particular implementation, the communication manager 108 selects the one or more acceptable links for transmission of the sets of sub-data objects based on determining that a count of the one or more acceptable links is greater than or equal to a threshold communication link count indicated by the data object 124. In a particular example, a first set of the sub-data objects is to be transmitted via the communication link 110A, a second set of the sub-data objects is to be transmitted via the communication link 110B, or both. A size of each of the first set of the sub-data objects is less than or equal to the first available bandwidth of the communication link 110A. A size of each of the second set of the sub-data objects is less than or equal to the second available bandwidth of the communication link 110B. In a particular example, each sub-data object of the first set of sub-data objects is to be transmitted serially (e.g., one-by-one) over the communication link 110A and each sub-data object of the second set of sub-data objects is to be transmitted serially over the communication link 110B. Serial transmission of a set of sub-data objects enables the set of sub-data objects to be transmitted over multiple transmission time periods. The first set of sub-data objects is transmitted via the communication link 110A concurrently (or simultaneously) with transmission of the second set of sub-data objects via the communication link 110B. The concurrent transmission of the first set and the second set via multiple links enables the data of the data object 124 to be transmitted during fewer transmission time periods than serial transmission of the first set and the second set via a single link. In a particular example, transmission of the data from the application 104 is high priority (e.g., impacts operation of the vehicle 102). Dividing the data object 124 into smaller sets of sub-data objects enables the data of the data object 124 to be transmitted via one or more links over multiple transmission time periods. The link and data object selection 806 continues to 1002.

The link and data object selection 806 includes, in response to determining that there are no remaining data objects, no remaining available links, or both, at 1002, determining that the transmission plan 136 for the available communication link ID(s) 134 and the data object identifier(s) 138 has been generated. For example, the communication manager 108, in response to determining that the data object identifier(s) 138 (e.g., the remaining data object identifiers) indicate at least one data object identifier, sends a data object status request indicating the data object identifier(s) 138 to the data object storage flow 142. The data object storage flow 142, in response to receiving the data object status request, updates the status field 292 of each of the data objects 124 indicated by the data object identifier(s) 138 to a first value (e.g., 0) to indicate that the data object 124 has not been transmitted.

Returning to FIG. 8, the data object communication flow 746 includes sending data, at 808. For example, the communication manager 108, based on the transmission plan 136, initiates transmission of data objects, sub-data objects, or a combination thereof, via the communication links 110. To illustrate, the communication manager 108, in response to determining that the transmission plan 136 indicates that a data object 124 is to be transmitted via a communication link 110, initiates transmission of the data object 124 via the communication link 110. In a particular example, the communication manager 108, in response to determining that the transmission plan 136 indicates that a first sub-data object of the sub-data objects 152 and a second sub-data object of the sub-data objects 152 are to be transmitted via a communication link 110A and a communication link 110B, respectively, initiates transmission of the first sub-data object via the communication link 110A concurrently with transmission of the second sub-data object via the communication link 110B.

In a particular example, the communication manager 108, in response to determining that the transmission plan 136 indicates that a set of sub-data objects is to be transmitted via a communication link 110, initiates serial transmission of the set of sub-data objects via the communication link 110. In a particular example, the communication manager 108, in response to determining that the transmission plan 136 indicates that a first set of sub-data objects and a second set of sub-data objects are to be transmitted via a communication link 110A and a communication link 110B, respectively, initiates serial transmission of the first set of sub-data objects via the communication link 110A concurrently with serial transmission of the second set of sub-data objects via the communication link 110B.

The data object communication flow 746 includes receiving transmission status, at 810. For example, the communication manager 108 receives notifications from the communication links 110 indicating whether a data object 124 (e.g., the sub-data objects 152) has been transmitted successfully. To illustrate, the communication manager 108 receives a notification from a communication link 110 indicating that a data object 124 (or a sub-data object 152) has been received successfully. The communication manager 108, in response to determining that a notification has not been received within a threshold duration of initiating a previous transmission of a data object 124 (or a sub-data object 152), determines that the previous transmission failed, initiates retransmission of the data object 124 (or the sub-data object 152), or both. The communication manager 108, in response to determining that a threshold number of pervious transmissions of a data object 124 (or the sub-data object 152) have failed, determines that transmission of the data object 124 (or the sub-data object 152) is unsuccessful. In a particular aspect, the communication manager 108 determines that transmission of a data object 124 is unsuccessful in response to determining that transmission of at least a threshold number of sub-data objects 152 of the data object 124 is unsuccessful. The communication manager 108 generates the transmission status 614 indicating whether transmission of a data object 124 (or the sub-data objects 152) is successful and provides the transmission status 614 to the data object communication flow 744.

In a particular aspect, the communication manager 108, in response to determining that a communication link 110 is unavailable, updates the transmission status 614 to indicate that the communication link 110 is unavailable. In a particular aspect, the communication manager 108 in response to determining that data transmission is disabled at the vehicle 102, updates the transmission status 614 to indicate that data transmission is disabled at the vehicle 102. In a particular aspect, the communication manager 108 in response to determining that the communication system 112 is unavailable, updates the transmission status 614 to indicate that the communication system 112 is unavailable.

Returning to FIG. 7, the data object communication flow 744 includes determining whether the transmission status 614 indicates a critical error, at 710. For example, the communication manager 108 determines that the transmission status 614 indicates a critical error in response to determining that the transmission status 614 indicates that data transmission is unavailable at the vehicle 102, that the communication system 112 is unavailable, or both.

The data object communication flow 744 includes, in response to determining that the transmission status 614 indicates a critical error, at 710, invoking an error handler, at 714. In a particular aspect, the error handler displays an alert, sends a message to a user device, transitions the communication manager 108 to a sleep state, or a combination thereof.

The data object communication flow 744 includes, in response to determining that the transmission status 614 does not indicate a critical error, at 710, sending the transmission status, at 712. For example, the communication manager 108, in response to determining that the transmission status 614 does not indicate any critical errors, sends the transmission status 614 to the data object storage flow 142.

Returning to FIG. 6, the data object retrieval flow 644 includes determining whether transmission is successful, at 632. For example, the communication manager 108 determines whether the transmission status 614 indicates that transmission of a data object 124 is successful.

The data object retrieval flow 644 includes, in response to determining that the transmission was unsuccessful, at 632, invoking an error handler, at 636. For example, the communication manager 108, in response to determining that the transmission status 614 indicates that transmission of a data object 124 is unsuccessful, invokes an error handler. In a particular aspect, the error handler sets the status field 292 of the data object 124 to a first value (e.g., 0) to indicate that the data object 124 has not been transmitted. In a particular aspect, the error handler, in response to determining that a TTL indicated by the TTL field 294 has expired, deletes (or marks for deletion) the data object 124 from the data storage 106.

The data object retrieval flow 644 includes, in response to determining that the transmission was successful, at 632, removing the sent data object, at 634. For example, the communication manager 108, in response to determining that the transmission status 614 indicates that transmission of a data object 124 is successful, deletes (or marks for deletion) the data object 124 from the data storage 106. In a particular aspect, the communication manager 108 updates a transmission log indicating that the data object 124 has been transmitted successfully.

The system 100 thus enables concurrent transmission of sub-data objects via multiple communication links. A technical effect of concurrent transmission of sub-data objects including distinct portions of data of an application 104 is an increase in data throughput for the application 104. The communication links can be selected for transmitting data of an application 104 based on dynamic information, such as a priority of the application 104, an acceptable threshold cost for the application 104, transmission cost associated with the communication links, or a combination thereof.

A size of the sub-data objects can be determined dynamically based on available bandwidth of communication links selected to transmit the sub-data objects. A technical effect of using multiple communication links to transmit portions of data of an application 104 includes increases security for the application 104. For example, multiple communication links have to be compromised for unauthorized access to all portions of the data.

Figure 3:
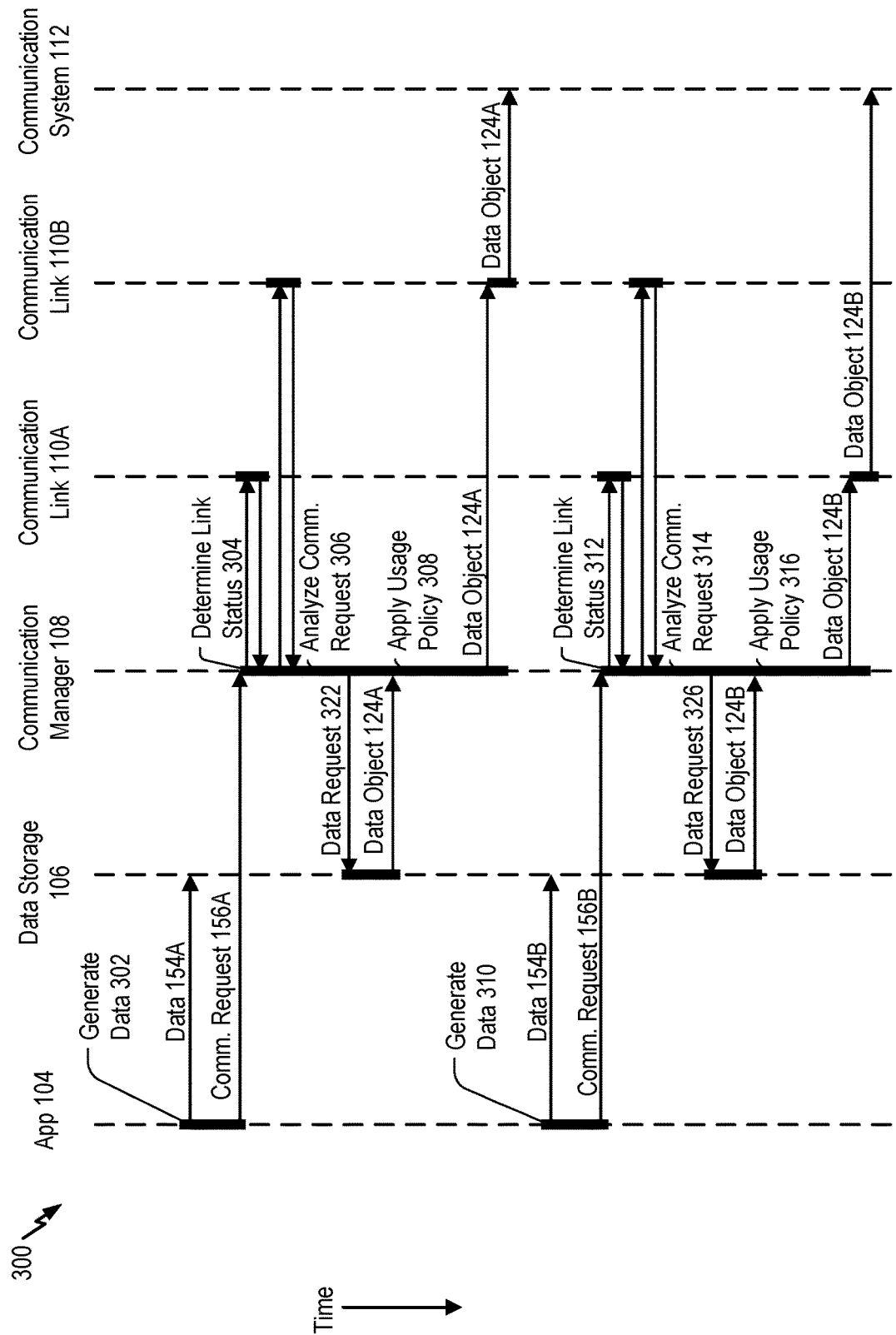
FIG. 3 is a ladder diagram that illustrates an example of a sequence of operations performed by the system of FIG. 1.

Referring to FIG. 3, an example 300 of a sequence of operations by the system 100 of FIG. 1 is shown. In a particular aspect, one or more operations of the example 300 are performed by an application 104, the data storage 106, the communication manager 108, a communication link 110A, a communication link 110B, the communication system 112, or a combination thereof.

An application 104 generates data, at 302. For example, an application 104 generates data 154A and stores the data 154A in the data storage 106. The application 104 sends a communication request 156A indicating the data 154A to the communication manager 108.

The communication manager 108 determines link status, at 304. For example, the communication manager 108, in response to receiving the communication request 156A, sends a first status request to the communication link 110A and a second status request to the communication link 110B. The communication manager 108 receives a first status response that is responsive to the first status request from the communication link 110A. The first status response indicates a first link status of the communication link 110A. The communication manager 108 receives a second status response that is responsive to the second status request from the communication link 110B. The second status response indicates a second link status of the communication link 110B.

In a particular aspect, the communication manager 108, in response to receiving the communication request 156A, retrieves the communication link status data 116 from the communication link status memory 114. In this aspect, the communication link status data 116 indicates the first link status and the second link status of the communication link 110A and the communication link 110B, respectively.

The communication manager 108 analyzes the communication request, at 306. For example, the communication manager 108 determines that the communication request 156A indicates an identifier (e.g., an address) of the data 154A.

The communication manager 108 sends a data request 322 to the data storage 106. For example, the data request 322 indicates the identifier of the data 154A. The communication manager 108 receives a data object 124A from the data storage 106 responsive to the data request 322. The data object 124A includes at least a portion of the data 154A.

The communication manager 108 applies a usage policy, at 308. For example, the communication manager 108 generates the transmission plan 136, as described with reference to of FIGS. 1, 8, and 10. To illustrate, the communication manager 108 selects the communication link 110B based on a cost associated with the communication link 110B, a cost threshold associated with the application 104, a size of the data object 124A, an available bandwidth of the communication link 110B, or a combination thereof.

The communication manager 108 initiates transmission of the data object 124A via the communication link 110B to the communication system 112. For example, the communication manager 108, in response to determining that the data object 124A is to be transmitted via the communication link 110B, initiates transmission of the data object 124A via the communication link 110B to the communication system 112.

The application 104 generates data, at 310. For example, an application 104 generates data 154B subsequent to generating the data 154A. The application 104 sends a communication request 156B indicating the data 154B to the communication manager 108. The communication manager 108 determines link status, at 312. In a particular aspect, the communication manager 108, in response to receiving the communication request 156B, retrieves the communication link status data 116 from the communication link status memory 114. In this aspect, the communication link status data 116 indicates a first link status and a second link status of the communication link 110A and the communication link 110B, respectively. The communication manager 108 analyzes the communication request, at 314. The communication manager 108 sends a data request 326 to the data storage 106 and receives a data object 124B from the data storage 106. The data object 124B includes at least a portion of the data 154B. The communication manager 108 applies a usage policy, at 316. For example, the communication manager 108 selects the communication link 110A based on a cost associated with the communication link 110A, a cost threshold associated with the application 104, a size of the data object 124B, an available bandwidth of the communication link 110A, or a combination thereof. The communication manager 108 initiates transmission of the data object 124B via the communication link 110A to the communication system 112.

The communication manager 108 can thus dynamically select different communication links 110 at different times to transmit data from the same application 104. For example, a selection of a communication link can be based on dynamic conditions, such as available bandwidth, link costs, application priority, data object size, etc.

Figure 4:
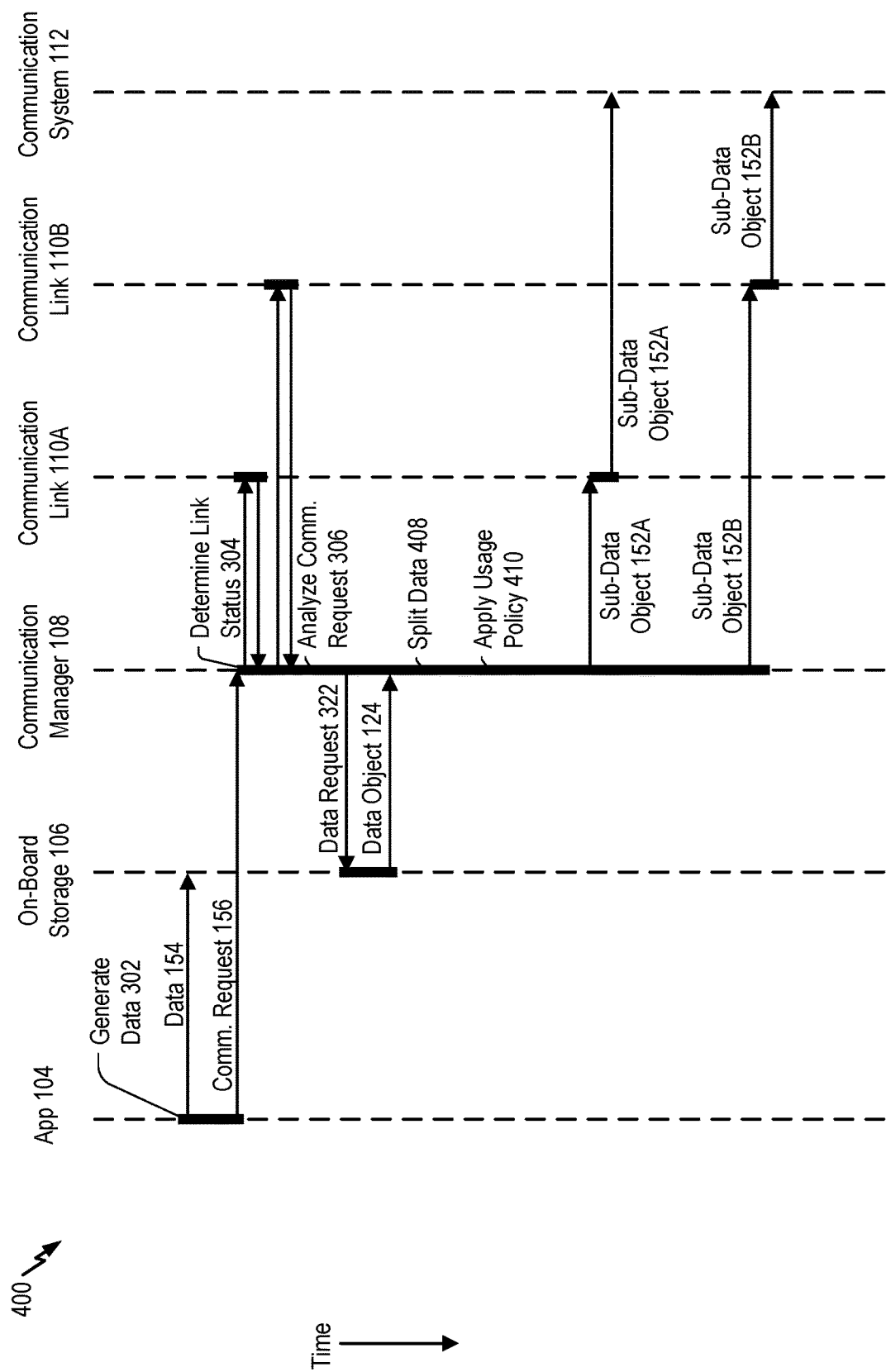
FIG. 4 is a ladder diagram that illustrates another example of a sequence of operations performed by the system of FIG. 1.

Referring to FIG. 4, an example 400 of a sequence of operations by the system 100 of FIG. 1 is shown. The example 400 differs from the example 300 in that multiple sub-data objects are generated from the data object 124 and transmitted concurrently via multiple communication links.

The communication manager 108 splits data, at 408. For example, the communication manager 108 generates a sub-data object 152A and a sub-data object 152B from the data object 124, as described with reference to FIGS. 1 and 10. To illustrate, the sub-data object 152A includes a first portion of the data 154 that is distinct from a second portion of the data 154 included in the sub-data object 152B.

The communication manager 108 applies a usage policy, at 410. For example, the communication manager 108 generates the transmission plan 136, as described with reference to of FIGS. 1, 8, and 10. The communication manager 108, in response to determining that the sub-data object 152A is to be transmitted via the communication link 110A and that the sub-data object 152B is to be transmitted via the communication link 110B, initiates transmission of the sub-data object 152A via the communication link 110A concurrently with initiating transmission of the sub-data object 152B via the communication link 110B.

The communication manager 108 can thus concurrently transmit distinct portions of the data 154 via distinct communication links 110. Transmitting distinct portions of the data 154 via distinct communication links 110 increases data throughput of the vehicle 102, increases communication security, or both.

Figure 11:
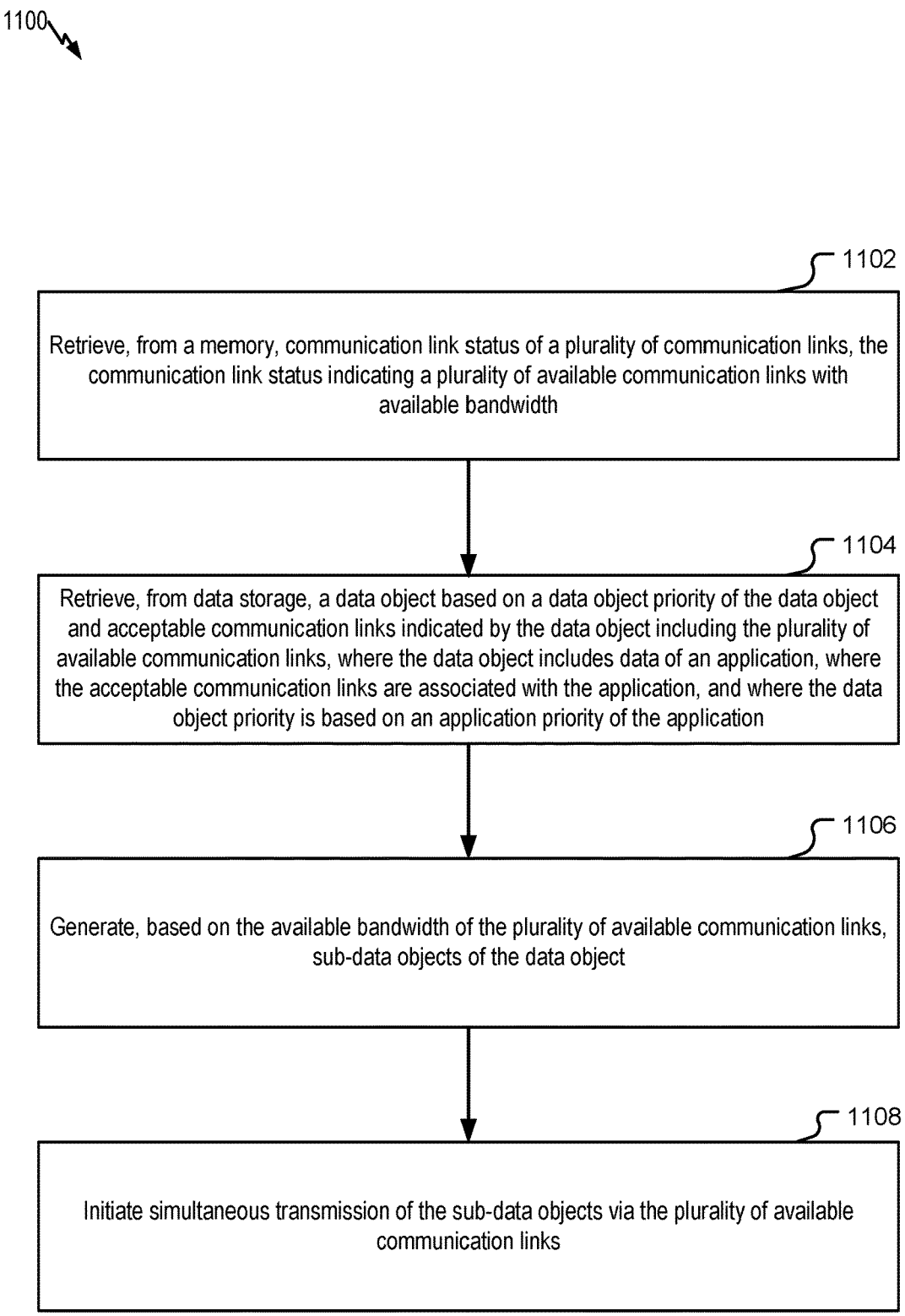
FIG. 11 is a diagram that illustrates a flow chart of an example of method of data communication via communication links.

FIG. 11 illustrates a method 1100 of data communication via communication links. In a particular implementation, one or more operations of the method 1100 are performed by the communication manager 108, the processor(s) 146, the communication link status monitor 162, or a combination thereof. In a particular implementation, the data object generation flow 140, the data object storage flow 142, the data object communication flow 144, the communication link status monitor flow 946, or a combination thereof, include one or more operations of the method 1100.

The method 1100 includes retrieving, from a memory, communication link status of a plurality of communication links, at 1102. For example, the data object communication flow 144 of FIG. 1 includes retrieving, from the communication link status memory 114, the communication link status data 116 indicating the communication link status of the communication links 110, as described with reference to FIGS. 1 and 8. The communication link status indicates a plurality of available communication links with available bandwidth. For example, the communication link status includes the available communication link identifier(s) 134 of FIG. 1.

The method 1100 also includes retrieving, from data storage, a data object based on a data object priority of the data object and acceptable communication links indicated by the data object including the plurality of available communication links, at 1104. For example, the data object retrieval flow 644 of the data object storage flow 142 includes retrieving a data object 124 based on a data object priority of the data object 124 and acceptable communication links 166 indicated by the data object including the plurality of available communication links (indicated by the available communication link identifier(s) 134), as described with reference to FIGS. 1 and 6-8. The data object 124 includes data of an application 104. The acceptable communication links 166 are associated with the application 104. The data object priority is based on an application priority 164 of the application 104.

The method 1100 further includes generating, based on the available bandwidth of the plurality of available communication links, sub-data objects of the data object, at 1106. For example, the link and data object selection 806 of FIG. 8 includes generating, based on available bandwidth of available communication links (e.g., indicated by the available communication link identifier(s) 134), the sub-data objects 152 of the data object 124, as described with reference to FIGS. 1 and 10.

The method 1100 also includes initiating concurrent transmission of the sub-data objects via the plurality of available communication links, at 1108. For example, the data object communication flow 144 includes initiating, based on the transmission plan 136, concurrent transmission of the sub-data objects 152 via the available communication links indicated by the available communication link identifier(s) 134, as described with reference to FIGS. 1 and 8.

Figure 12:
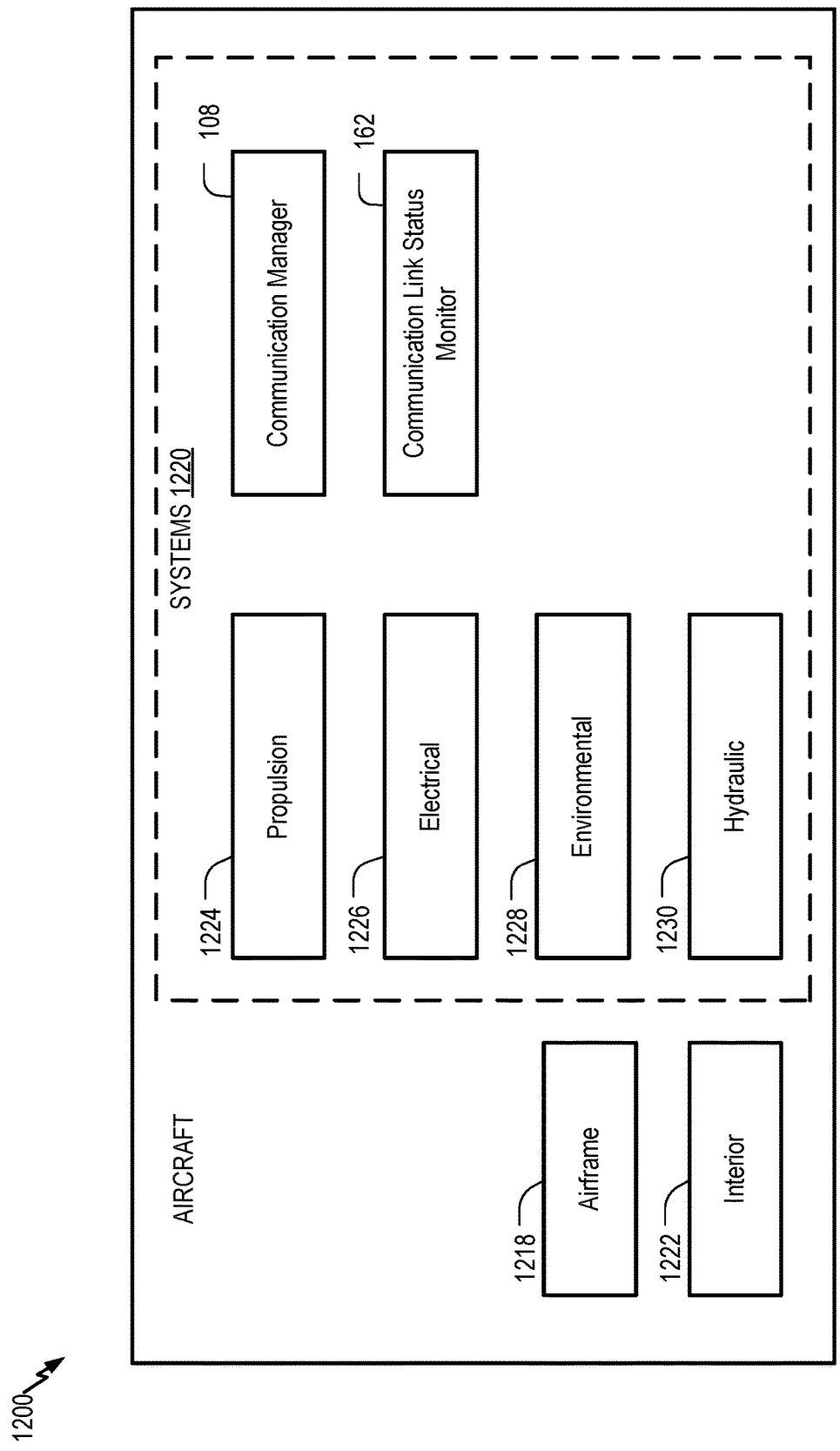
FIG. 12 is a block diagram of a vehicle configured to support aspects of computer-implemented methods and computer-executable program instructions (or code) according to the present disclosure.

Aspects of the disclosure may be described in the context of an aircraft 1200 as shown in FIG. 12. The aircraft 1200 includes an airframe 1218 with a plurality of systems 1220 (e.g., high-level systems) and an interior 1222. Examples of the systems 1220 include one or more of a propulsion system 1224, an electrical system 1226, an environmental system 1228, a hydraulic system 1230, the communication manager 108, or the communication link status monitor 162. Other systems could also be included.

The communication manager 108, the communication link status monitor 162, or both, are configured to support aspects of computer-implemented methods and computer-executable program instructions (or code) according to the present disclosure. For example, the communication manager 108, the communication link status monitor 162, or portions thereof, are configured to execute instructions to initiate, perform, or control one or more operations described with reference to FIGS. 1-12. Although an aerospace example is shown, the present disclosure can be applied to other industries. For example, the communication manager 108, the communication link status monitor 162, or both, can be used onboard a manned or unmanned vehicle (such as a satellite, a watercraft, or a land-based vehicle), in a building or other structure.

Although one or more of FIGS. 1-12 illustrate systems, apparatuses, and/or methods according to the teachings of the disclosure, the disclosure is not limited to these illustrated systems, apparatuses, and/or methods. One or more functions or components of any of FIGS. 1-12 as illustrated or described herein may be combined with one or more other portions of another of FIGS. 1-12. For example, one or more elements of the method 1100 of FIG. 11 may be performed in combination with other operations described herein. Accordingly, no single implementation described herein should be construed as limiting and implementations of the disclosure may be suitably combined without departing form the teachings of the disclosure. As an example, one or more operations described with reference to FIGS. 1-12 may be optional, may be performed at least partially concurrently, and/or may be performed in a different order than shown or described.

In some implementations, a non-transitory, computer readable medium stores instructions that, when executed by one or more processors, cause the one or more processors to initiate, perform, or control operations to perform part or all of the functionality described above. For example, the instructions may be executable to implement one or more of the operations or methods described with reference to FIGS. 1-12. In some implementations, part or all of one or more of the operations or methods of FIGS. 1-12 may be implemented by one or more processors (e.g., one or more central processing units (CPUs), one or more graphics processing units (GPUs), one or more digital signal processors (DSPs)) executing instructions, by dedicated hardware circuitry, or any combination thereof.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A system for communication comprising:
data storage configured to store a data object, the data object comprising output data of an application and metadata, wherein the metadata indicates a data object priority and one or more acceptable communication link types associated with the application, and wherein the data object priority is based on an application priority of the application; and
one or more processors configured to:
retrieve, from a memory, communication link status of a plurality of communication links, the communication link status indicating a plurality of available communication links with available bandwidth;
retrieve the data object from the data storage based on the data object priority and based on the plurality of available communication links including a set of at least two communication links with communication link types of the one or more acceptable communication link types;
generate, based on the available bandwidth of each communication link of the set, sub-data objects of the data object;
initiate concurrent transmission of the sub-data objects via the at least two communication links of the set; and
responsive to receiving first output data from the application:
generate a plurality of data objects based on the first output data, each data object of the plurality of data objects indicating the data object priority and the one or more acceptable communication link types, wherein the plurality of data objects includes the data object and the first output data includes the output data; and
store the plurality of data objects in the data storage.

2. The system of claim 1, wherein each communication link of the set is associated with a particular utilization cost.

3. The system of claim 2, wherein the one or more processors are further configured to select, based on the data object priority and total utilization cost associated with transmitting the output data, particular communication links of the set.

4. The system of claim 1, wherein each of the plurality of data objects indicates a source, a destination, the application, a time to live, a data object size, a data object identifier, or a combination thereof.

5. The system of claim 1, wherein the one or more processors are further configured to, responsive to receiving the first output data from the application, access configuration data from the memory to determine the application priority and the one or more acceptable communication link types.

6. The system of claim 5, wherein the one or more processors are further configured to update the configuration data responsive to receiving an update request via one of the plurality of communication links.

7. The system of claim 1, wherein the one or more processors are configured to, in response to determining that a size of the data object fails to satisfy a particular available bandwidth of communication links of the set, determine that multiple communication links are to be used to transmit portions of the output data.

8. The system of claim 1, wherein the one or more processors are configured to, in response to determining that multiple communication links are to be used to transmit portions of the output data:
generate first sub-data objects from a first portion of the output data of the data object; and
generate second sub-data objects from a second portion of the data object, wherein the concurrent transmission of the sub-data objects includes transmission of the first sub-data objects via a first communication link of the set concurrently with transmission of the second sub-data objects via a second communication link of the set.

9. The system of claim 8, wherein a first size of each of the first sub-data objects is based on a first bandwidth of a first available communication link, and wherein a second size of each of the second sub-data objects is based on a second available bandwidth of the second communication link.

10. The system of claim 8, wherein one or more sub-data objects corresponding to a remaining portion of the data object are concurrently transmitted via one or more additional available communication links of the set.

11. The system of claim 1, further comprising a communication link status monitor configured to update the communication link status.

12. The system of claim 1, wherein the one or more processors are configured to: determine, based on notifications received via the plurality of available communication links, whether the sub-data objects have been transmitted successfully; and in response to determining that the sub-data objects have been transmitted successfully, designate the data object for deletion from the data storage.

13. A method of communication comprising:
retrieving, at a device from a memory, communication link status of a plurality of communication links, the communication link status indicating a plurality of available communication links with available bandwidth;
retrieving, at the device from a data storage, a data object based on a data object priority included in metadata of the data object and based on the plurality of available communication links including a set of at least two communication links with communication link types of one or more acceptable communication link types identified in a portion of the metadata, wherein the data object comprises output data of an application and the metadata, and wherein the data object priority is based on an application priority of the application;

generating, based on the available bandwidth of each communication link of the set, sub-data objects of the data object;

initiating concurrent transmission of the sub-data objects via the at least two communication links of the set; and responsive to receiving first output data from the application:

generating, at the device, a plurality of data objects based on the first output data, each data object of the plurality of data objects indicating the data object priority and the one or more acceptable communication link types, wherein the plurality of data objects includes the data object and the first output data includes the output data; and storing the plurality of data objects in the data storage.

14. The method of claim 13, further comprising selecting, based on the data object priority and total utilization cost associated with transmitting the output data, particular communication links from the set.

15. The method of claim 14, wherein each of the particular communication links is associated with a particular utilization cost further comprising.

16. The method of claim 15, further comprising, responsive to receiving first data output from the application, accessing configuration data to determine the application priority and the one or more acceptable communication link types.

17. The method of claim 16, further comprising updating the configuration data responsive to receiving an update request via one of the plurality of communication links.

18. A computer-readable storage device storing instructions that, when executed by a processor, cause the processor to perform operations comprising:

retrieving, from a memory, communication link status of a plurality of communication links, the communication link status indicating a plurality of available communication links with available bandwidth;

retrieving, from a data storage, a data object based on a data object priority included in metadata of the data object and based on the plurality of available communication links including a set of at least two communication links with communication link types of one or more acceptable communication link types identified in a portion of the metadata, wherein the data object comprises output data of an application and the metadata, and wherein the data object priority is based on an application priority of the application;

generating, based on the available bandwidth of each communication link of the set, sub-data objects of the data object;

initiating concurrent transmission of the sub-data objects via the at least two communication links of the set;

responsive to receiving first output data from the application:

generating a plurality of data objects based on the first output data, each data object of the plurality of data objects indicating the data object priority and the one or more acceptable communication link types, wherein the plurality of data objects includes the data object and the first output data includes the output data; and storing the plurality of data objects in the data storage.

19. The computer-readable storage device of claim 18, wherein the operations further comprise, in response to determining that a size of the data object fails to satisfy a particular available bandwidth of each of the at least two communication links of the set:

generating first sub-data objects from a first portion of the data object; and generating second sub-data objects from a second portion of the data object, wherein the concurrent transmission of the sub-data objects includes transmission of the first sub-data objects via a first available communication link of the set concurrently with transmission of the second sub-data objects via a second available communication link of the set.

20. The computer-readable storage device of claim 19, wherein a first size of each of the first sub-data objects is based on a first available bandwidth of the first available communication link, and wherein a second size of each of the second sub-data objects is based on a second available bandwidth of the second available communication link.

21. The computer-readable storage device of claim 19, wherein the operations further comprise selecting the set based at least in part on determining that a count of the at least two communication links of the set satisfies a threshold communication link count associated with the application, and wherein the threshold communication link count is based on a security setting associated with the application.

* * * * *